(12) United States Patent
Durfee et al.

(10) Patent No.: US 11,054,297 B2
(45) Date of Patent: Jul. 6, 2021

(54) FLUID SENSING SWITCH

(71) Applicant: Bilge Sense LLC, Newport, RI (US)

(72) Inventors: David A. Durfee, Scituate, RI (US);
Petar Horvatic, Providence, RI (US);
Courtney Pauline Medeiros, Somerset, MA (US); Walmen Dumaliang, Providence, RI (US); Jeanette Numbers, Providence, RI (US); Alexander M. Wang, Macedon, NY (US); Benjamin Ricci, Warwick, RI (US)

(73) Assignee: Bilge Sense LLC, Newport, RI (US)

( * ) Notice: Subject to any disclaimer, the term of this patent is extended or adjusted under 35 U.S.C. 154(b) by 54 days.

(21) Appl. No.: 16/415,251

(22) Filed: May 17, 2019

(65) Prior Publication Data

US 2019/0353512 A1 Nov. 21, 2019

Related U.S. Application Data

(60) Provisional application No. 62/672,883, filed on May 17, 2018.

(51) Int. Cl.
*G01F 23/26* (2006.01)
*F04B 49/06* (2006.01)
*F04B 49/025* (2006.01)

(52) U.S. Cl.
CPC .......... *G01F 23/261* (2013.01); *F04B 49/025* (2013.01); *F04B 49/06* (2013.01)

(58) Field of Classification Search
CPC ....... G01F 23/261; F04B 49/06; F04B 49/025

USPC ........................................................ 73/300 C
See application file for complete search history.

(56) References Cited

U.S. PATENT DOCUMENTS

| | | | |
|---|---|---|---|
| 4,018,683 A | | 4/1977 | Walters et al. |
| 4,804,936 A | * | 2/1989 | Sale ...................... G01F 23/241 |
| | | | 324/446 |
| 5,576,582 A | | 11/1996 | White |
| 6,121,765 A | | 9/2000 | Carlson |
| 2001/0015099 A1 | | 8/2001 | Blaine |
| 2007/0164751 A1 | * | 7/2007 | Parachini .............. G01F 23/241 |
| | | | 324/557 |
| 2010/0215511 A1 | * | 8/2010 | Eller ...................... F04B 49/02 |
| | | | 417/44.1 |

OTHER PUBLICATIONS

International Search Report and Written Opinion issued in connection with corresponding International Application No. PCT/IB19/54110 dated Oct. 29, 2019.
International Preliminary Report on Patentability and Written Opinion issued in connection with corresponding International Application No. PCT/IB2019/054110 dated Nov. 17, 2020.

* cited by examiner

*Primary Examiner* — Tarun Sinha
(74) *Attorney, Agent, or Firm* — Womble Bond Dickinson (US) LLP; John J. Penny, Jr.

(57) ABSTRACT

A fluid sensing switch comprising a flex sensor having a plurality of conductive sensing areas and an energizing conductive area and a synchronous detector that detects a presence and a content of a bilge and produces a signal that is used to activate a pump.

6 Claims, 20 Drawing Sheets

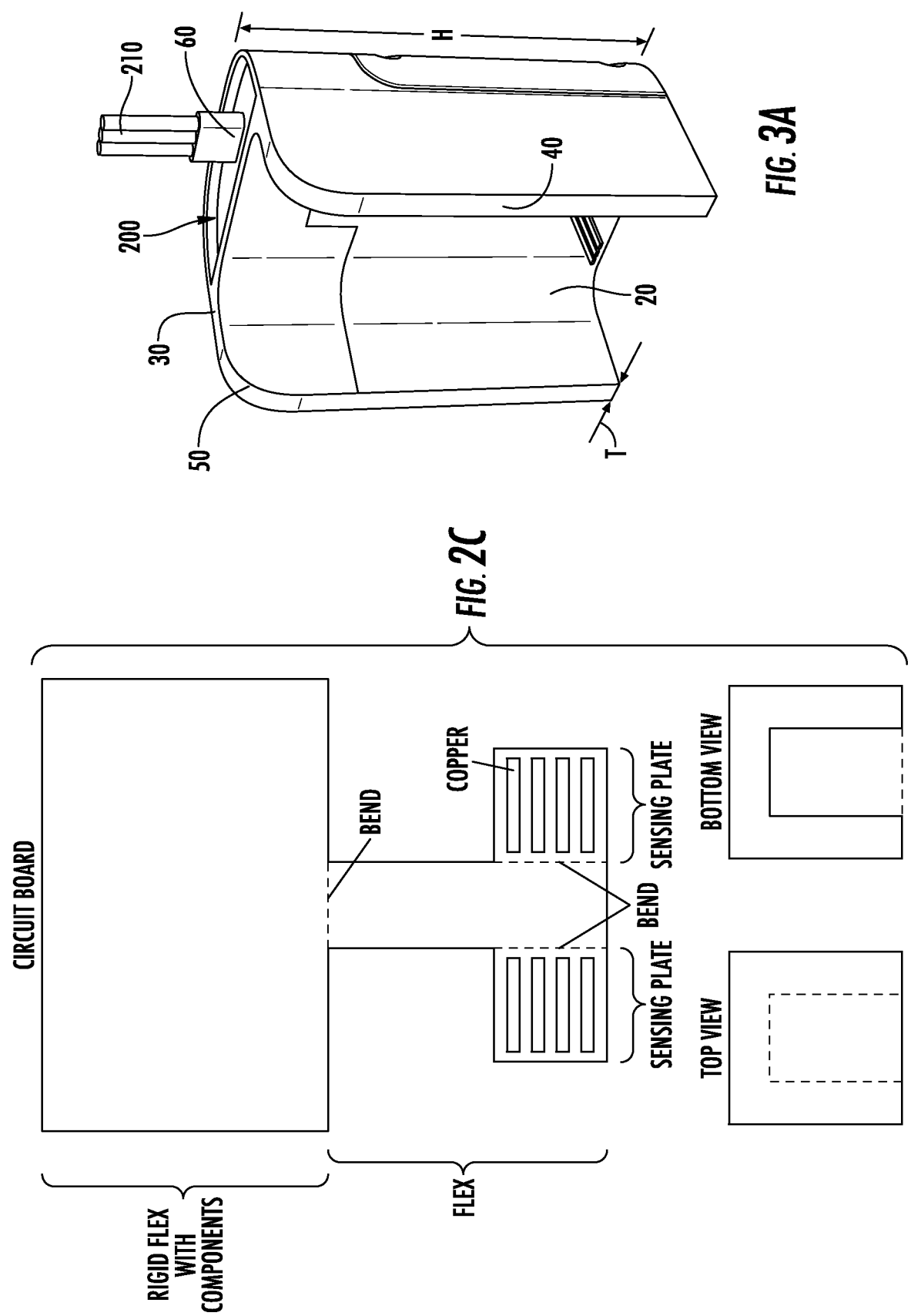

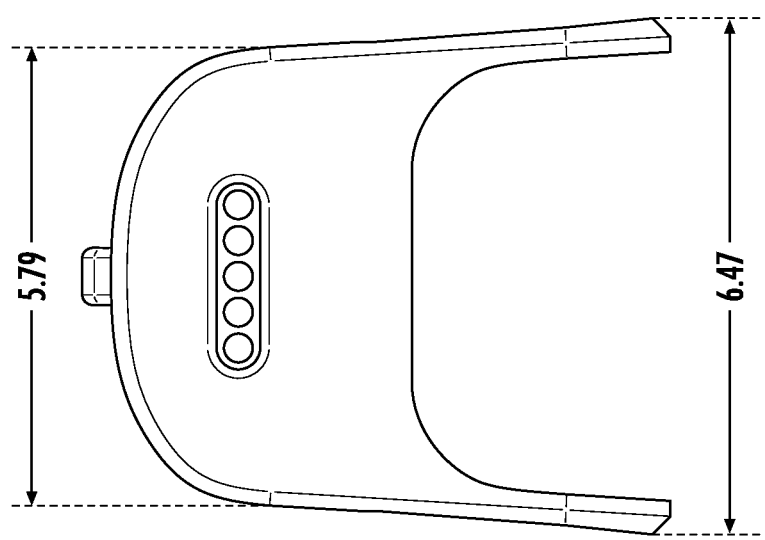
FIG. 18B
FIG. 18A

FLUID SENSING SWITCH

The present application claims benefit under 35 U.S.C. § 119(e) to U.S. provisional application No. 62/672,883 filed on May 17, 2018.

BACKGROUND

The present invention relates generally a sensor for detecting fluids, and more particularly to a fluid sensing switch for a boat, watercraft or vessel.

In general, most boats, regardless of the material or construction and fabrication, have a tendency to take on a certain amount of water when floating in a body of water. Water entering a boat hull generally tends to accumulate in the lower portion of the hull usually referred to as the "bilge." While small amounts of water within the bilge of a boat is a tolerable and generally common condition, extensive water collection within a bilge of a boat hull is extremely undesirable and may, if left unattended, prove dangerous or even catastrophic.

Bilge pumps are typically used to pump excess water from the bilge. In general, a fluid sensing switch, referred to as a bilge pump switch, activates and deactivates a bilge pump in response to predetermined water levels in the bilge. However, in the past, bilge pump switches have been unreliable mechanical "float-type" switches that stick causing the bilge pump to remain "on" or remain "off." Electronic switches also can either "stick on," keeping the bilge pump running indefinitely due to a high conductivity of soapy water used to clean a vessel, or never turn the pump on, due to low conductivity which comes as the result of oil mixed with water commonly found in the bilge.

Different types of fluids can be present in bilge. For example, salty/brackish water, fresh water, soapy water, a mixture of oil and water, a mixture of fuel and water, a mixture of oil, fuel and water, or pure fuel can be found in bilge. If a bilge pump pumps water containing fuel or oil, then damage to the environment may occur, which may result in fines being levied on the boat operator. What is needed is a switch that prevents the bilge pump from pumping fluid that contains fuel or oil and overcomes the shortcomings pointed out above.

It is also desirable to detect a fluid in a tank, such as an oil tank, gas tank, etc. It is also desirable to distinguish between oil and water and air in a tank.

SUMMARY

At least one embodiment of the present invention is directed to a fluid sensing switch that controls a bilge pump based on the contents of the bilge. Specifically, if the bilge contains mostly water, the switch of at least one embodiment of the invention activates the bilge pump to pump out water from the bilge. If the bilge contains oil and water, the switch does not activate the bilge pump so that oil is not pumped out from the bilge. If the bilge contains only air, the switch does not activate the bilge pump. The switch can detect the difference between air and oil/fuel. The term "oil" can encompass oil, diesel fuel and gasoline.

A fluid sensing switch comprising a flex sensor having a plurality of conductive sensing areas and an energizing conductive area and a synchronous detector that detects a presence and a contents of a bilge and produces a signal that is used to activate a pump.

A fluid sensing switch comprising a flex sensor having a plurality of conductive sensing areas and an energizing conductive area detects a presence and a content of a bilge and produces a signal that is used to activate a pump.

A fluid sensing switch comprising a synchronous detector that detects a presence and a content of a bilge and produces a signal that is used to activate a pump.

The assembled switch can be formed into one piece so that it is easy to install.

A system comprising a fluid sensing switch and a pump, wherein the pump is activated by the fluid sensing switch when a bilge contains a certain content and when the bilge reaches a predetermined level.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIGS. 2A-2C shows the flex sensor of FIG. 1.

FIGS. 3A-3E show further views of the mechanical housing of the embodiment shown in FIG. 1.

FIGS. 18A and 18B show a top view and a front view, respectively, of the mechanical housing of FIG. 16.

DETAILED DESCRIPTION

Figure 1:
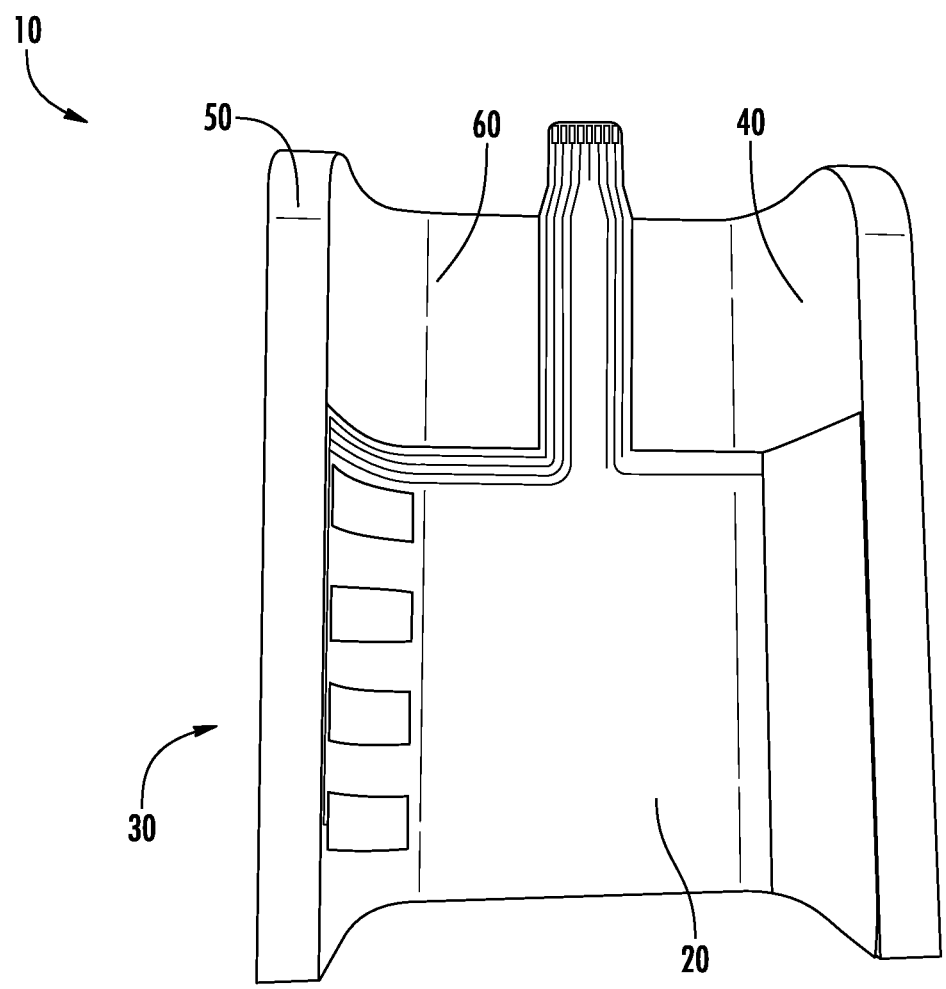
FIG. 1 shows an overall view of a sensor accordingly an embodiment of the invention.

As shown in FIG. 1 (overall view of sensor), the fluid sensing sensor 10 comprises a flex sensor 20 that is used to detect the contents of a fluid, such as bilge fluid. The flex sensor 20 can be installed in the mechanical housing 30, as shown in FIG. 1. The mechanical housing 30 comprises two opposing sides 40/50 and a middle portion 60 between the two opposing sides 40/50, thereby forming a C shape. The flex sensor 20 is flexible so that it can be mounted to the mechanical housing 30 so that the middle portion of the flex sensor 20 is mounted to the middle portion 60 and the side portions of the flex sensor 20 are mounted to the opposing sides 40/50 of the mechanical housing 30 such that plurality of conductive sensing areas (receive electrodes) 100 face the energizing conductive area (drive electrode) 110. This makes is possible to accurately detect the presence and content of the bilge as presented below.

Figure 2A:
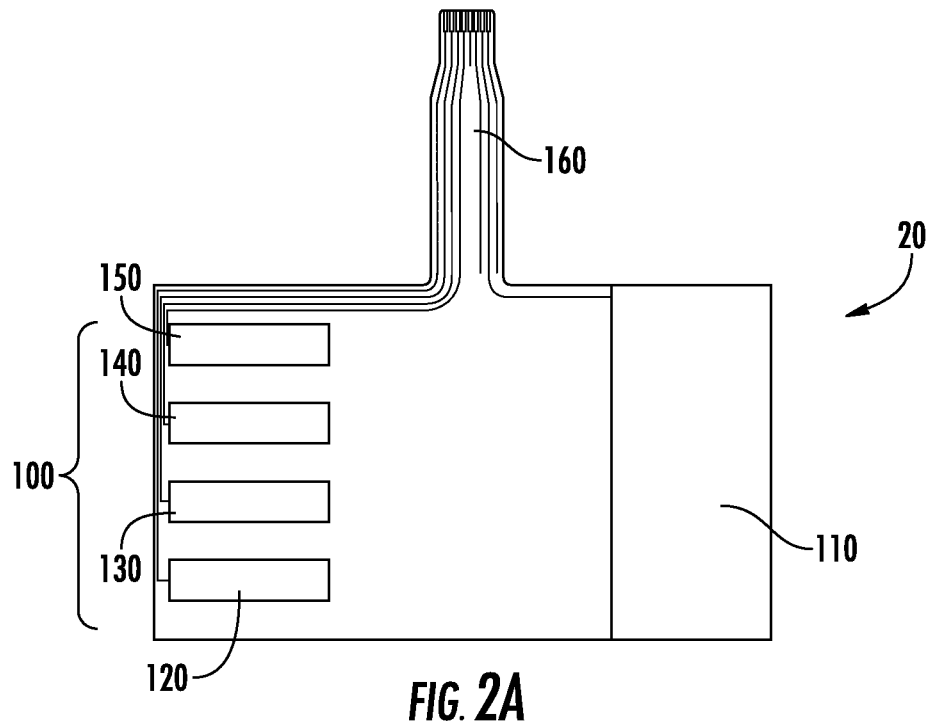

The flex sensor 20 can be made of multiple layers comprising a conductive material enclosed by flexible insulating materials. For example, the flex sensor can be made of polyimide Kapton and epoxy-based adhesive, which makes the flex sensor robust in salt water, oil, fuel and other harsh chemicals. As shown in FIG. 2A, the flex sensor 20 includes a plurality of conductive sensing areas 100 on one side of the flex sensor 20 that are arranged to create capacitive coupling through parallel capacitance. The flex sensor 20 also comprises an energizing conductive area 110 on the other side of the flex sensor 20 opposite to the conductive sensing areas 100. As shown in FIG. 2A, the energizing conductive area 110 can be in the shape of a rectangle having an area that is larger than the combined area of the conductive sensing areas 100. A plurality of energizing conductive areas could be used. In this embodiment, the conductive sensing areas are insulated, but they could be exposed.

The conductive sensing areas 100 and the energizing conductive area 110 can be made of copper, but also can be made of any material that is conductive such as aluminum, carbon, gold, a conductive glue or epoxy or screen printed conductive ink printed onto Mylar, or carbon. The conductive sensing areas 100 and the energizing conductive area 110 can be embedded in almost any material and can be insulated or uninsulated. For example, the conductive material could be embedded in an insulating polyvinylidene fluoride (PVD or Kynar) in the firm of a flex circuit.

In FIG. 2A, four (4) conductive sensing areas are shown, but one (1), two (2), three (3), or five (5) or more than five (5) conductive sensing areas can be used. The additional electrodes allow the sensor 10 to be more capable of operating properly when oil is present in the bilge fluid, as presented in more detail below. The embodiment including four (4) conductive sensing areas includes a bottom conductive sensing area 120, a second conductive sensing area 130 above the bottom conductive sensing area 120, a third conductive sensing area 140 above the second conductive sensing area 130, and a top conductive sensing area 150 above the third conductive sensing area 140. END May 17, 2019

In embodiment having only two (2) conductive sensing areas, the bottom conductive sensing are would be used to turn the switch off and the top conductive sensing area would be used to turn the switch on. In such an embodiment, the gains and thresholds of the bottom conductive sensing area could be set to the gains and threshold values of the bottom conductive sensing area in the embodiment with four (4) conductive sensing areas. The gains and thresholds of the top conductive sensing area could be set to the gains and threshold values of the third conductive sensing (from the bottom) in the embodiment with four (4) conductive sensing areas.

The plurality of conductive sensing areas 100 in FIG. 2A and the energizing conductive area 110 help to provide noise suppression. Three (3) thin, flexible ground traces can be formed on the flex sensor 20 to help suppress noise, but are not necessary. Two (2) of the ground traces lie on the outside of the tab portion 160. A third trace is positioned between the conductive sensing areas 100 and the energizing conductive area 110 in order to protect the conductive sensing areas 100 from noise from the energizing conductive area 110. This helps to make the signals that drive the conductive sensing areas less susceptible to noise.

The flex sensor 20 includes a tab 160 portion that allows connection to a circuit board and other electronics (not shown). Any suitable connector, such as a TE Connectivity 84952-8 ZIF connector, can be used. The ground traces on the flex sensor 20 can be connected to ground on the circuit board through the ZIF connector. The flex sensor also can be bonded directly to the circuit board. Also, the connector could be part of the circuit board, such as in a rigid/flex arrangement.

The electronics used within the sensor portion of the device can be powered using an internal electrically isolated power supply[1]. This allows the unit to operate without having to ground the liquid in the bilge for proper operation, and also provides additional noise immunity, thereby preventing the sensor from acting as a boat zinc anode. That is, this provides EMC noise immunity that can reduce the effects of electronic noise from equipment such as radios, pumps, and motors. EMC immunity also is provided by the synchronous detection in which the driven signal is modulated by a frequency and the modified received signal is demodulated by the same frequency. That demodulated input is then filtered to provide a value representing the received signal energy, as presented in more detail below.

[1] Electrically isolated power supply means there is an electronic barrier between outputs and not tied to a common ground.

FIG. 2C shows a schematic view of the flex sensor and illustrates the flex area and bending points.

Figure 3B:
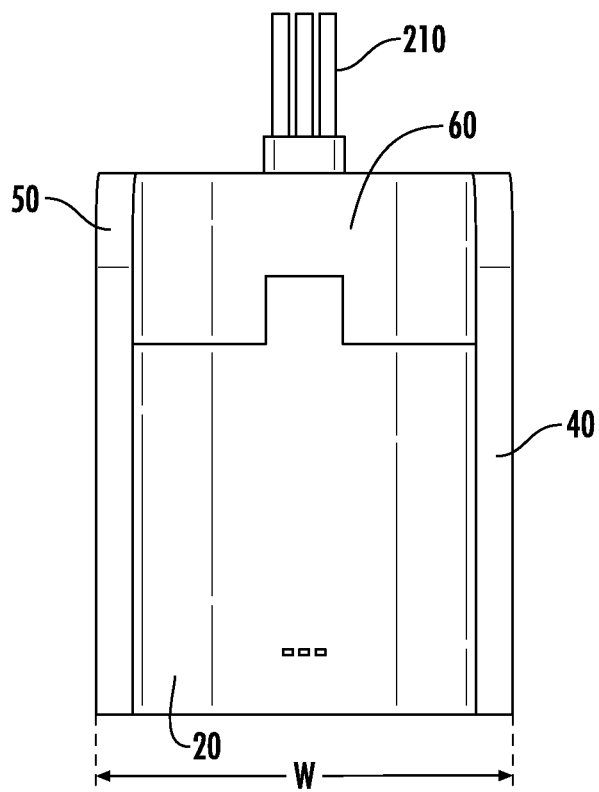
Figure 3C:
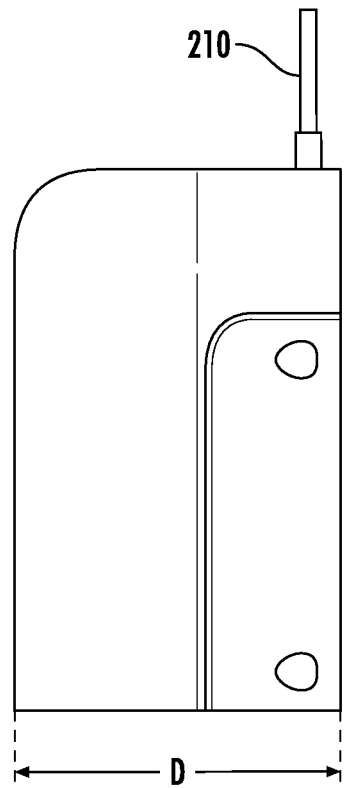
Figure 3D:
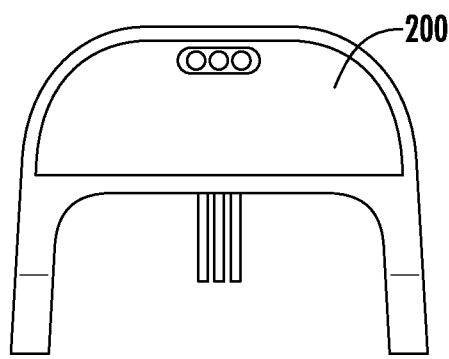
Figure 3E:
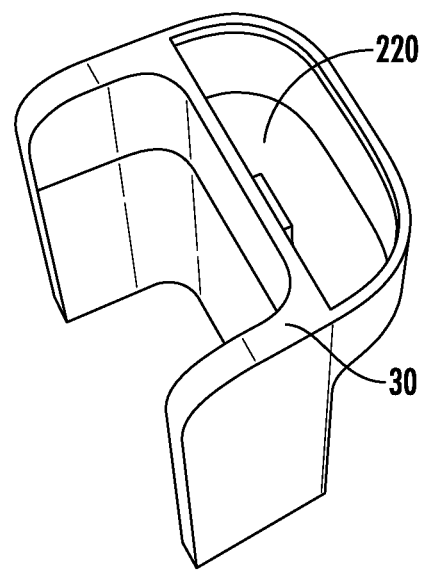

FIGS. 3A-3E show further views of the mechanical housing 30. FIG. 3A shows a perspective view of the mechanical housing 30 with the flex sensor 20 attached thereto. As presented above in the description of FIG. 1, the mechanical housing 30 comprises two opposing sides 40/50 and a middle portion 60 therebetween, thereby forming a C shape. The flex sensor 20 is mounted to the mechanical housing 30 such that the middle portion of the flex sensor 20 is mounted to the middle portion 60 and the side portions of the flex sensor 20 are mounted to the opposing sides 40/50 of the mechanical housing 30 such that plurality of conductive sensing areas 100 face the energizing conductive area 110. As shown in FIGS. 3A and 3D, and described in more detail below, the fluid sensing sensor 10 also comprises a top housing 200 which covers the top portion of the mechanical housing 30, and through which cables 210 extend. The cables 210 connect the circuit board to the pump. The top housing can be fastened to the mechanical housing 30 with glue or with another suitable fastener. As shown in FIG. 3E, the top housing 200 covers a space 220 formed in the top portion of the mechanical housing 30.

Figure 4:
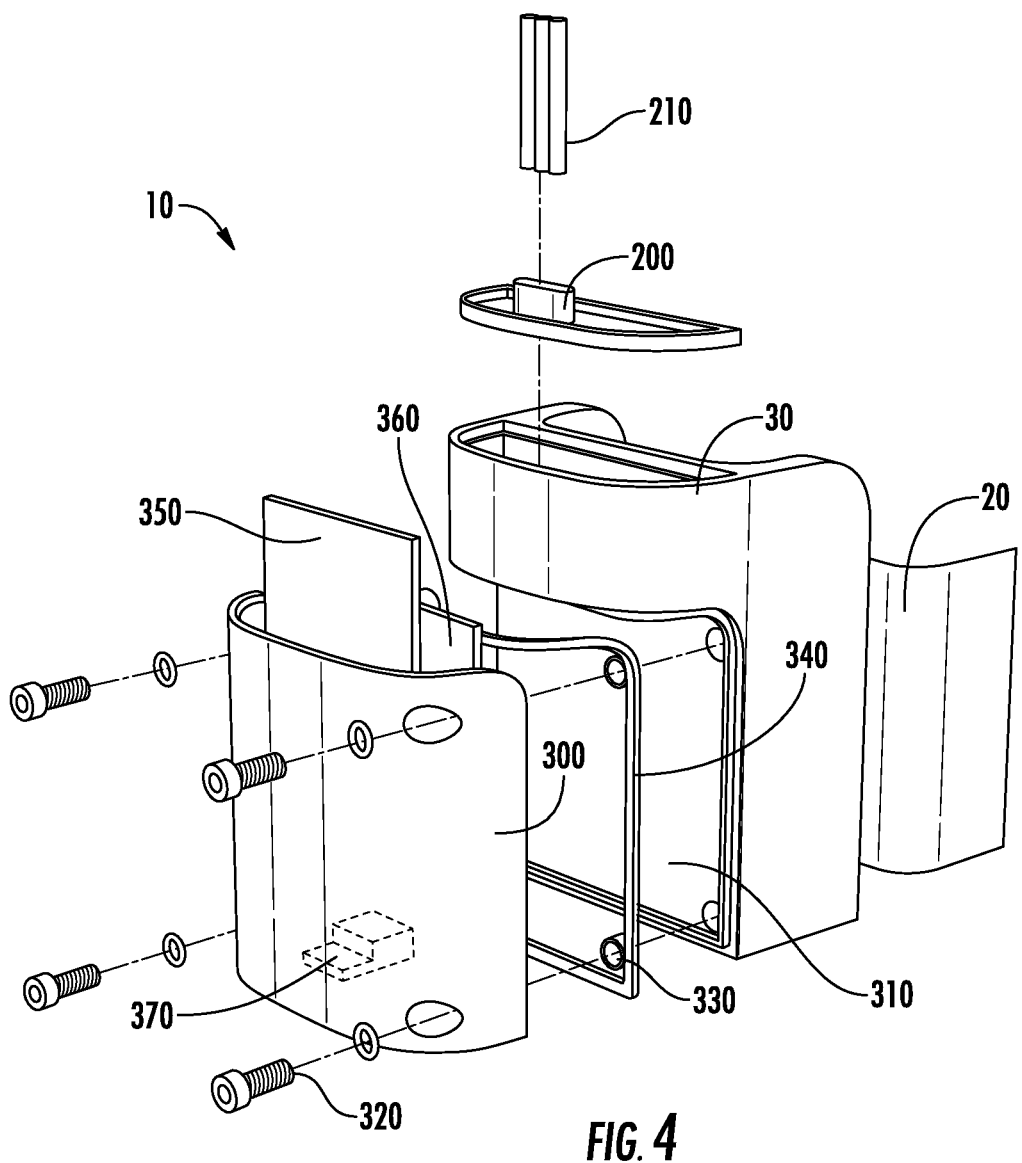
FIG. 4 shows a rear view exploded view of the embodiment shown in FIG. 1.
Figure 5:
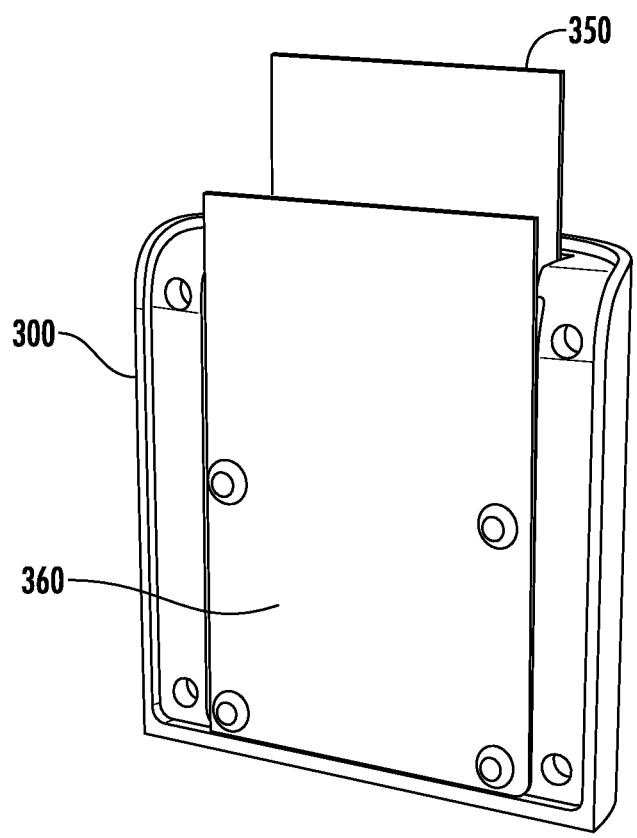
FIG. 5 shows a rear portion of the sensor of the embodiment of FIG. 1.

As shown in FIG. 4, the fluid sensing sensor 10 includes a heat sink 300 attached to the rear side 310 of the mechanical housing 30. This can be done, for example, with four (4) head-sealing screws 320 and corresponding threaded inserts 330. A die-cut seal 340 is mounted between the rear portion of the housing 30 and the heat sink 300. In the embodiment shown in FIG. 4, a radio board 350, main board 360 and transistor component 370 are positioned in the heat sink 300. FIG. 5 shows a front view of the heat sink 300 with the radio board 350 and main board 360 attached thereto. The radio board 350 can be used to send the sensor information to another system wirelessly. Only one main board 360 is shown, but additional boards could be used. Also, although the heat sink 300 is shown as a separate component, the heat sink could be made part of the main board 360.

When the bilge rises to a point when the bilge level reaches approximately the bottom of the second conductive sensing area 130, the switch turns on, which can then activate a pump. As presented above, the bottom conductive sensing area 120 acts as a reset for the switch. That is, when the level of bilge is lowered to a point when the bilge level reaches approximately the bottom of the bottom conductive sensing area 120, the switch will turn off, which can then de-activate the pump. That is, the first and second conductive sensing areas 120/130 are used to form a hysteresis loop to turn on and off the switch. This prevents the switch from rapidly turning on and off so that damage to the pump can be avoided. A Set Reset Latch (SR latch) can be used to accomplish pump activation and shutoff and provide this hysteresis function. The set reset latch is an electronic design that remembers that the second conductive sensing area was contacted by water even when the water recedes. Then this memory is cleared by having the reset of this device activated by the first sensor.

The dimensions of the fluid sensing sensor 10 are selected so that when the sensor is placed in or mounted to the hull of a boat, the conductive sensing areas can detect the bilge at the appropriate level. For example, the height of the each of the conductive sensing areas 100 can be ¼ inches and positioned ¼ inch from the from the adjacent conductive sensing area. The bottom conductive sensing area 120 can be positioned ¼ inch from the bottom of the flex sensor 20. With these dimensions, ¼ inch of water, and any oil on top of that, remains in the bilge when the pump is turned off, and the pump will turn on when the water level rises another ½ inch.

Figure 2B:
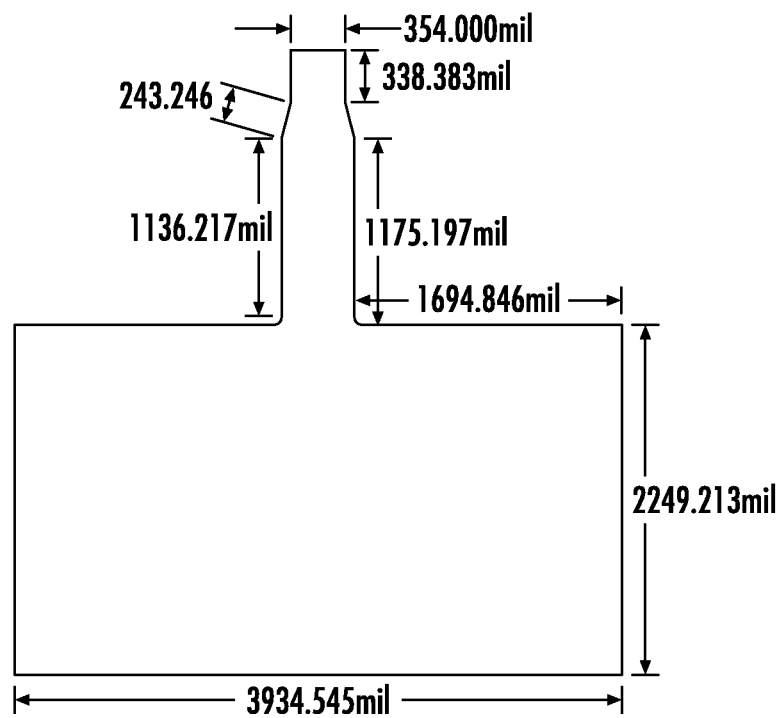

For the mechanical housing 30, it is preferable that the mechanical housing 30 has a height H of approximately 100 mm, and a width W of approximately 68 mm, as shown in FIGS. 3A and 3B. The depth D of the mechanical housing 30 is preferably approximately 58 mm, as shown in FIG. 3C. Using these dimensions, the water level to activate the sensor is 25 mm. The flex sensor can have the dimensions shown in FIG. 2B. These dimensions are only one possible set of dimensions and are not required to practice all embodiments of the invention.

Figure 6:
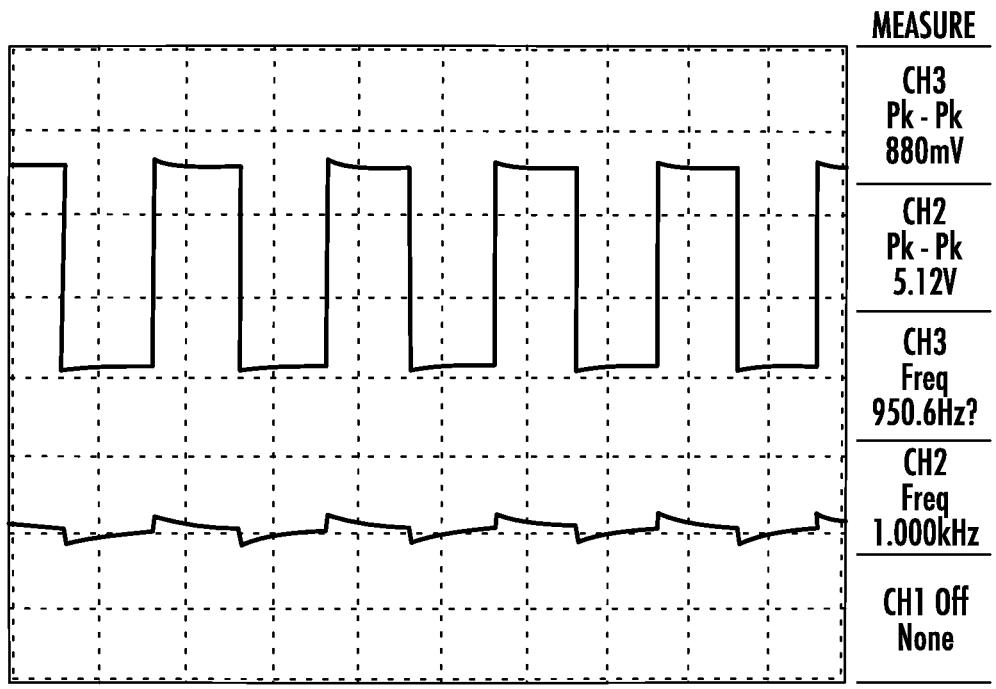
FIG. 6 shows an example of the amount of energy that is transferred in air.

The amount of energy transferred varies based on the type of fluid. Therefore, the amount of energy that is transferred from the energizing conductive area 110 to the conductive sensing areas 100 can be used to determine the type of fluid that is present in the space in the middle portion 60 of the housing 30 between the opposing sides 40/50 of the mechanical housing 30. Any signal can be used to energize the energizing conductive area. It is preferable to use an AC signal. A DC signal could be used when the conductive sensing areas and energizing conductive areas are uninsulated. A square wave can be used so as to minimize the effects of noise. For example, when the energizing conductive area 110 is energized with a 1 KHz square wave ranging from 0V to 5V, the amount of energy transferred to the conductive sensing areas 100 varies based on the type of fluid that is present between the opposing sides 40/50 of the mechanical housing 30. As shown in FIG. 6, when only air is present, very little of the energy is transferred to the conductive sensing areas 100. In FIG. 6, the upper trace is the 1 KHz square wave applied to the energizing conductive area 110, and the lower trace is the energy that is coupled through the air to the lower conductive sensing area 120. Similarly, when only oil is present, very little of the energy is transferred to the conductive sensing areas 100.

Figure 7:
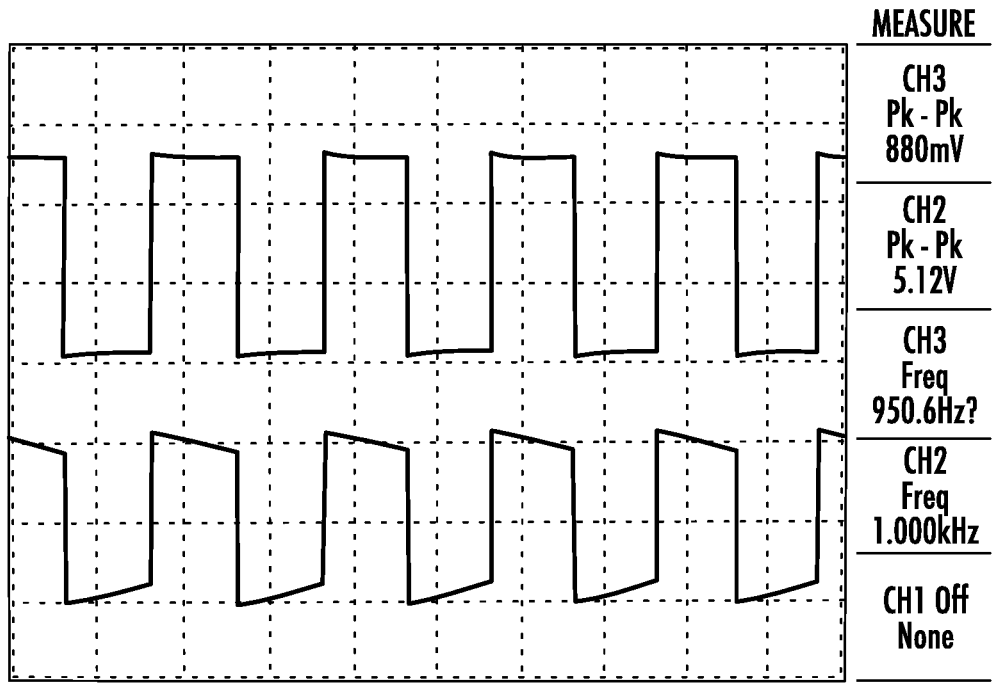
FIG. 7 shows an example of the amount of energy that is transferred in water.

When only water is present, a significant portion of the energy is transferred to the sensing areas 100, as shown in FIG. 7. In FIG. 7, the upper trace is the 1 KHz square wave applied to the energizing conductive area 110, and the lower trace is the energy that is coupled through the water to the lower conductive sensing area 120.

The 5V pk-pk 1 Khz square wave can be generated from a TI TLC555CD 555 timer. The circuitry shown in FIG. 8 can be used, which enables a stable operation. In this design, the following values can be used: $R_A$=2K, $R_B$=6.2K and C=0.1 µF, meaning frequency=1.002 KHz, $t_H$ (time high) =568.26 µs, and $t_L$ (time low)=429.64 µs. Any other appropriate circuitry could be used.

It is possible to detect the presence of oil since there are differences between the amount of energy that is coupled through air as compared to the amount of energy that is coupled through oil. For example, a binary oil reporting system can be used. The method of detecting oil vs air vs water can be done using level shifting, synchronous detecting[2], and window comparing. Synchronous detection is a method of detecting a signal of a known type in the presence of high noise power. It can be viewed as a frequency specific active rectifier or as a demodulator. In our particular case, the frequency and phase of the drive signal to the conductive area is also used to "rectify" or demodulate the received signal from the sensing conductive area. This is done on three of the four conductive sensing areas in this embodiment. The bottom conductive sensing area 120 acts as the reset of the pump and can sense oil. The next highest conductive sensing area 130 acts as the set of the pump and can sense oil. In this embodiment, the third highest conductive sensing area 140 is not used and is not connected to any detecting circuitry. The highest conductive sensing area 150 is used to trip the high-water alarm and to be used as a pump test during installation. If water reaches the top conductive sensing area 130, a signal will be sent to the annunciator.

[2] A synchronous detector can also be viewed as an "active rectifier" or a demodulator.

Figure 15A:
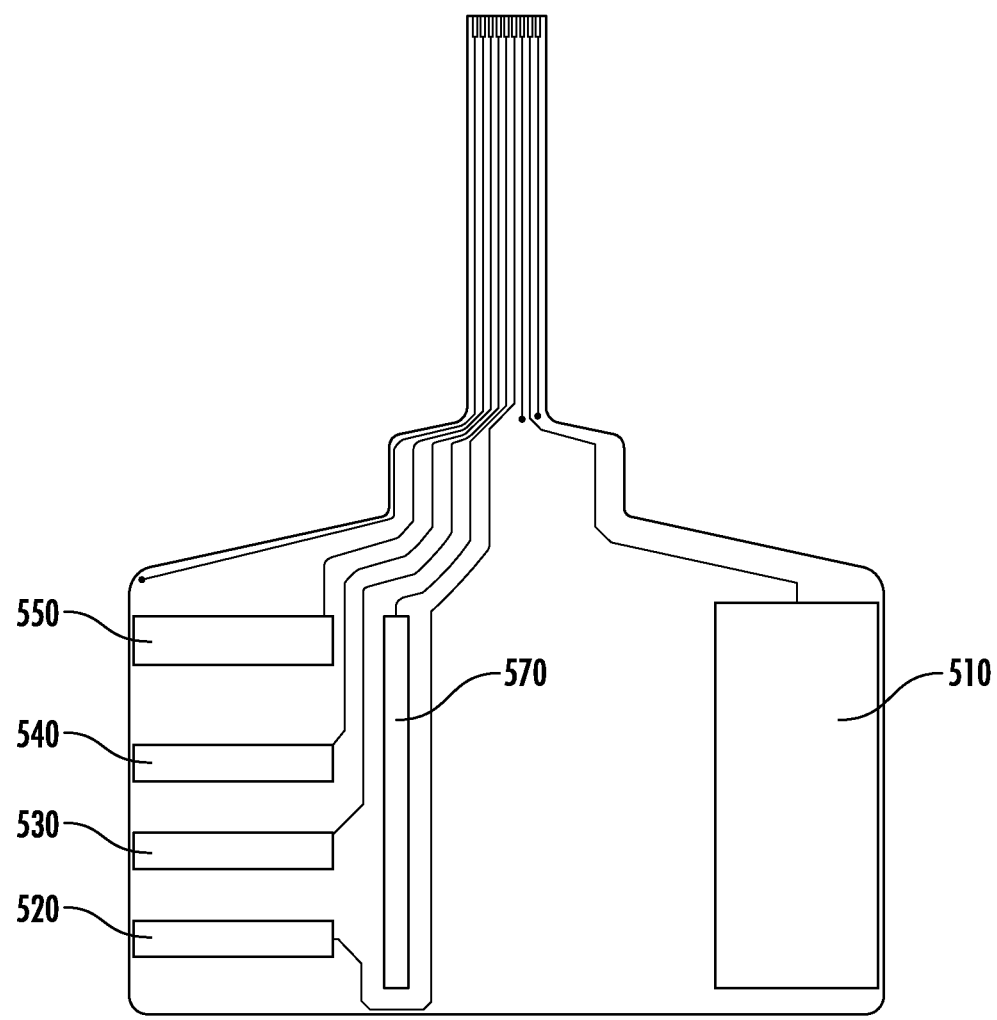
FIGS. 15A and 15B show another embodiment of the flex sensor.
Figure 15B:
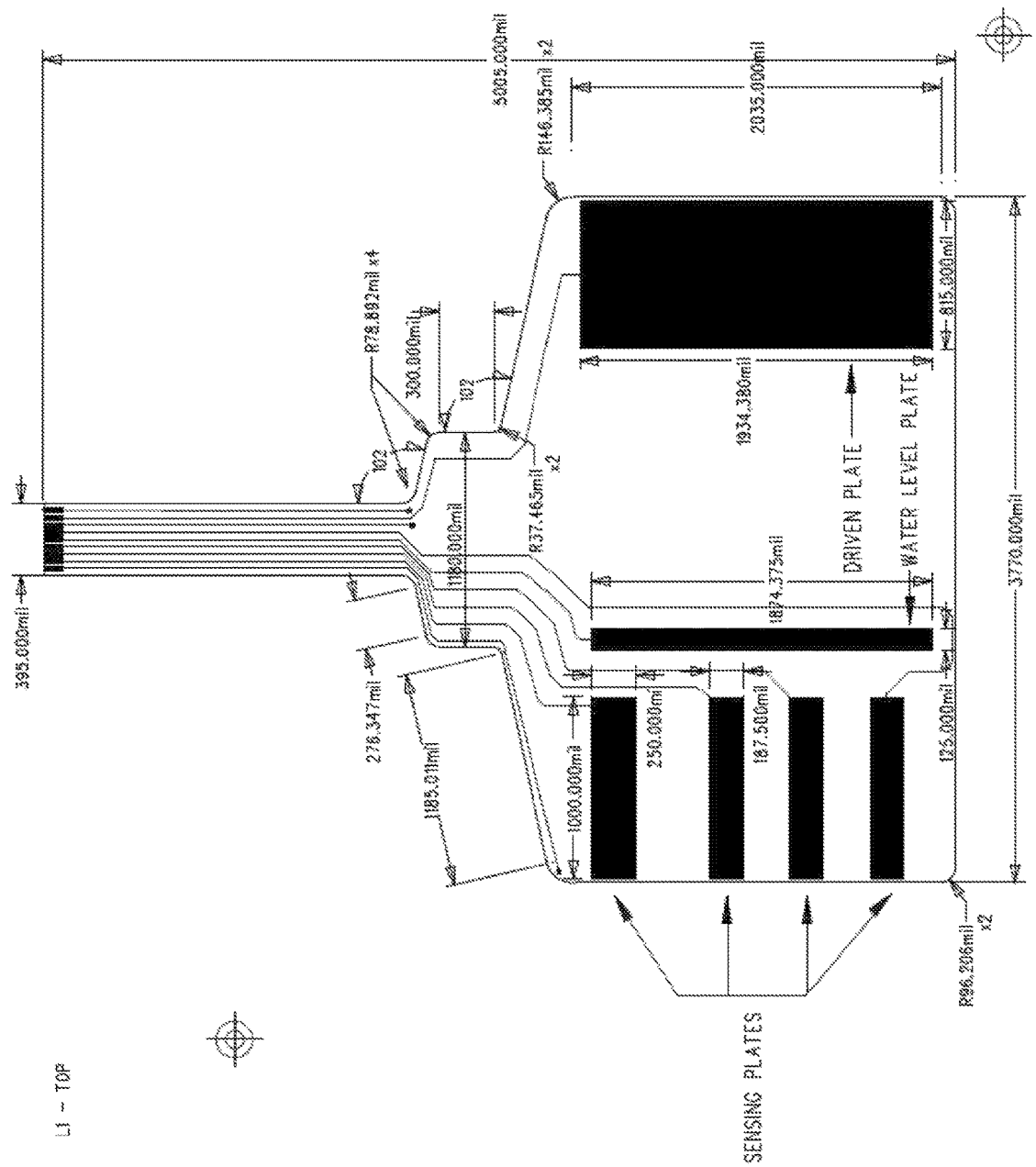

FIGS. 15A and 15B show an alternate embodiment that includes five (5) current sensing areas. FIG. 15B includes possible dimensions of the flex sensor. These dimensions are only one possible set of dimensions and are not required to practice all embodiments of the invention. In this embodiment, the third conductive sensing area 540 can be used to determine whether there is enough fluid so that the pump should be turned on. Specifically, when water reaches the bottom of the third conductive sensing area 540, the pump is turned on. The first and second conductive sensing areas 520 and 530 can be used to turn off the pump. When the bilge contains only water, the first conductive sensing area 520 can be used to turn off the pump when the water level reaches the bottom of the first conductive sensing area 520 so that the bilge level can be reduced as low as possible. However, if the first conductive sensing area 520 is used to turn off the pump when there is an oil film on top of the water, the centrifugal force of the pump causes the water in the vicinity of the pump to move away from the pump, thereby creating a whirlpool, which can cause oil to reach the pump impeller. Therefore, when there is an oil film on top of the water, the second conductive sensing area 530 is used to turn off the pump. The highest conductive sensing area 550 is used to trip the high-water alarm and to be used as a pump test during installation. The top conducting sensing area 550 can be a synchronous detector and a comparator that can actuate the pump with as little electronics as possible so it can act as a "safety" in case there is some issue with the normally operating electronics.

In order to determine whether there is an oil film on top of the water, at least one embodiment of the invention utilizes the fact that the transfer of energy changes over time as the oil rises over a conducting sensing area. For example, when the electronics detects a change in liquid level from an increase in energy received at a conducting sensing area, for example at the third conductor sensing area 540, the electronics can check the rate of rise of energy. If the rise of energy is slow, for example it takes more than approximately 250 ms for the voltage to reach a threshold it can be determined that an oil film that has hindered the rise in energy is present. In contrast, if the energy received at a conducting sensing area rises rapidly, for example it takes less than approximately 250 ms for voltage to reach a threshold, then it can be determined that only water is present. This threshold can be modified to change the percentage of occasions when the determination is made that oil is present. Also, this threshold can be modified based upon many factors such as water motion, the viscosity of the oil, the thickness of the oil film, and mechanical configuration, such as whether the device is positioned vertically, whether there are baffles added, etc.

Another way to determine that there is an oil film on top of the water is when the third conductive sensing area 540 detects enough energy to signal water and the first conductive sensing area 520 does not detect enough energy to signal water. In this situation, the second conductive sensing area 530 is used to turn off the switch. Alternatively, if the third conductive sensing area 540 receives enough energy within 250 ms of sensing fluid and the first conductive sensing area 520 has a high energy reading, it is determined that water is present and the pump is turned on until the first conductive sensing area 520 does not sense fluid. If the third conductive sensing area 540 does not receive enough energy within 250 ms of sensing fluid, it is determined that oil is present and the pump is turned on until the second conductive sensing area 530 does not sense fluid. These threshold energy levels are set based on what the energy level is when the liquid is at different height levels.

When the fourth conductive sensing area 540 senses water, the pump can be turned on and an alarm can be generated. In this situation, the turn off can occur at the first conductive sensing area 520 or the second conductive sensing area 530.

When the bilge includes a soap film, the behavior of the system changes as the bilge level falls. Specifically, the amount of remaining film can cause a higher amount of energy transfer than simply air. That is, even when the bilge level has receded below a conductive sensing area, for example below the third conductive sensing area, the third conducting sensing area can still have a high energy level. Accordingly, in at least one embodiment, the turn-on threshold is increased so that the pump will not remain on in the case of a soap film existing in the bilge.

The fourth conductive sensing area 550 can be used a safety turn-on in case the third conductive sensing area 540 is not working properly so that if the fourth conductive sensing area 550 detects water, the pump can be turned on using a minimum amount of electronics. The fourth conductive sensing area 550 can also be used to manually turn on and off the pump, for example by placing and removing a wet hand between the energizing conductive area 510 and the fourth conductive sensing area 550. This makes it possible for the user to turn on the pump without having to push a button or turn a switch. Further, the fourth conductive sensing area 550 can be used to provide an alarm output to inform the boat owner of any unexpected operation.

The embodiment shown in FIGS. 15A and 15B also includes a vertical subtraction electrode 570, which improves the ability to detect oil. The subtraction electrode 570 is a thin electrode that extends vertically from below the first conductive sensing area 520 to approximately the top of the fourth conductive sensing area 550, as shown in FIGS. 15A and 15B. As the bilge fluid level rises to a level close to a conductive sensing areas, the amount of energy received by the conductive sensing area increases, even though the bilge fluid has not yet reached that conductive sensing area. The subtraction electrode 570 subtracts this effect from the energy measured by the conductive sensing area, which results in a more accurate reading of the level of the bilge fluid, which improves the fidelity of the switch. This can be done in an analog fashion using opamps.

The fourth conductive sensing area 550 also could be comprised of a pair of bands that can be connected together electrically. This will help implement the alarm and test functions of the fourth conductive sensing area 550.

The table below shows possible threshold, gains and trip values when a 4V drive signal is used. Different voltages can be used for the drive signal. Also, different thresholds can be used in different configurations. If the voltage of the drive

|  | Gain(s) | Thresholds | Water/Oil |
| --- | --- | --- | --- |
| 1st Conductive Sensing Area | Gain: 5.32 | Turn-on: 4.0061 V<br>Turn-off: 3.8068 V |  |
| 2nd Conductive Sensing Area | Subtract gain: 15<br>Signal gain: 31.37 | Trip: 4.001 V |  |
| 3rd Conductive Sensing Area | Subtract gain: 10<br>Signal gain: 31.534 | Turn-on: 3.71 V<br>Turn-off: 3.457 V | Turn-on: 3.75 V<br>Turn-off: 3.5 V<br>Trip Soap: 4.798 V |
| 4th Conductive Sensing Area | Subtract gain: 10<br>Signal gain: 31.534<br>(signal to subtract ratio of 3.153 to 1 with a gain of 10 applied on top) | Trip: 4.096 V<br>Higheater: 4.130 V |  |

As seen in FIGS. 6 and 7, the signals entering the circuit from the sensor are AC coupled and centered about 0V. In order for the synchronous detector to work on the 0V-5V supply available on the printed circuit board, the signal can be shifted to be centered about 2.5V. Adding a negative supply to accommodate for the AC coupling generally requires an additional regulator and supporting circuitry, which adds cost and requires additional real estate. The first stage of the synchronous detector, components before R25 and R27 in FIG. 9 above, is put in place to center the signal around 2.5V. Any other appropriate circuitry could be used.

Figure 9:
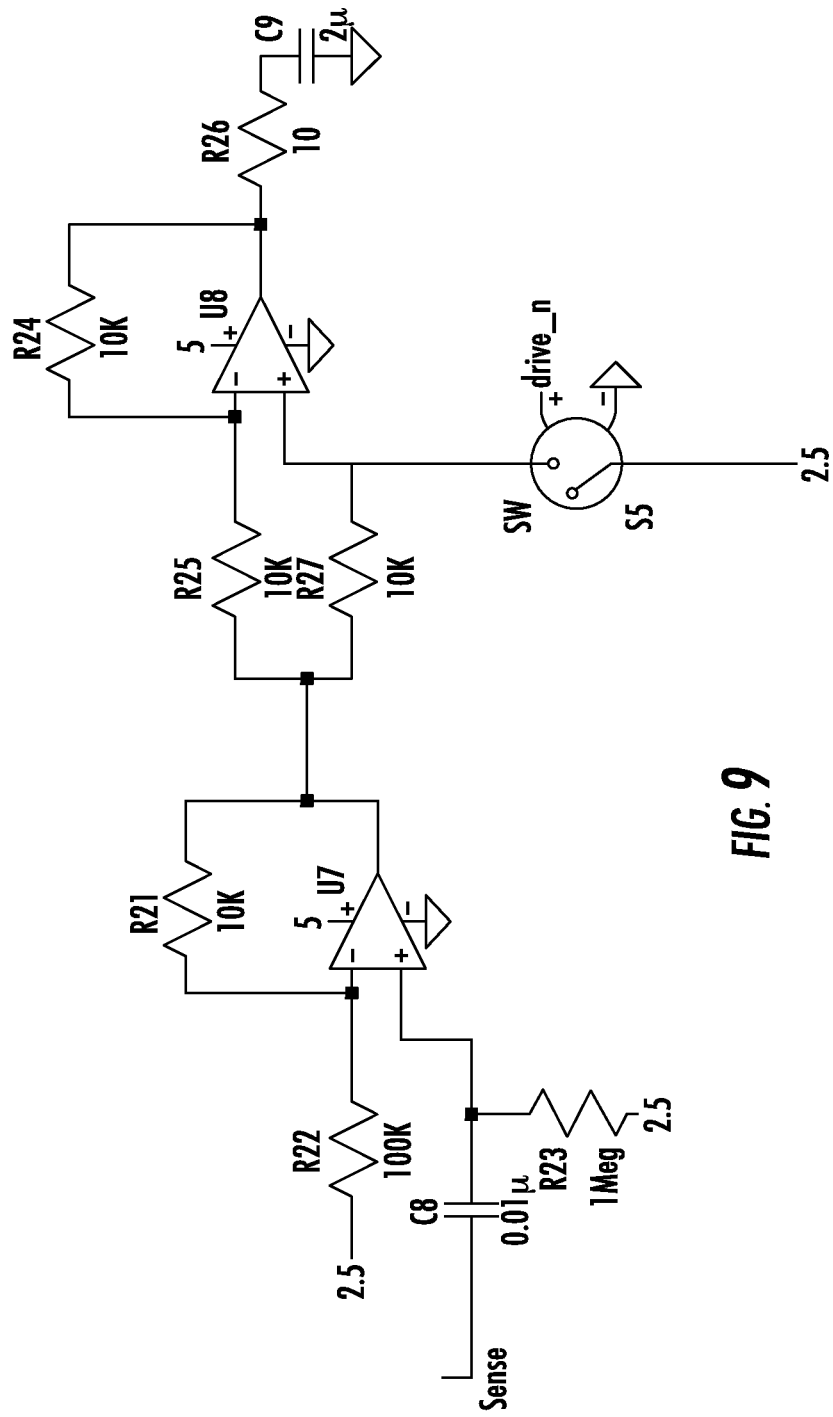
FIG. 9 shows a circuit that can be used in at least one embodiment of the invention.

The system operates as an op am with a gain of plus and minus 1. The second stage of the analog circuitry, components after U7 and R21 in FIG. 9, is the synchronous detector. During testing, the sensed signals were in phase with the signals driving the energizing conductive area 110. Referring to FIG. 9, when Sense is high, drive_n (driving switch SW) is low, which means that the positive terminal of op amp is disconnected from the 2.5V reference. The system acts like an amplifier with a gain of 1, thereby essentially passing through the most positive portion of the Sense signal. When Sense is low, drive_n (driving switch SW) is high meaning the positive terminal of the op amp is connected to the 2.5V reference. The system acts like an inverting op amp with a gain of −1, thus, flipping the low portion of the Sense signal to the high portion. The output RC filter removes signals at other frequencies, so the output voltage is a dc signal equal to half the peak-to-peak voltage of the measured square wave.

Figure 8:
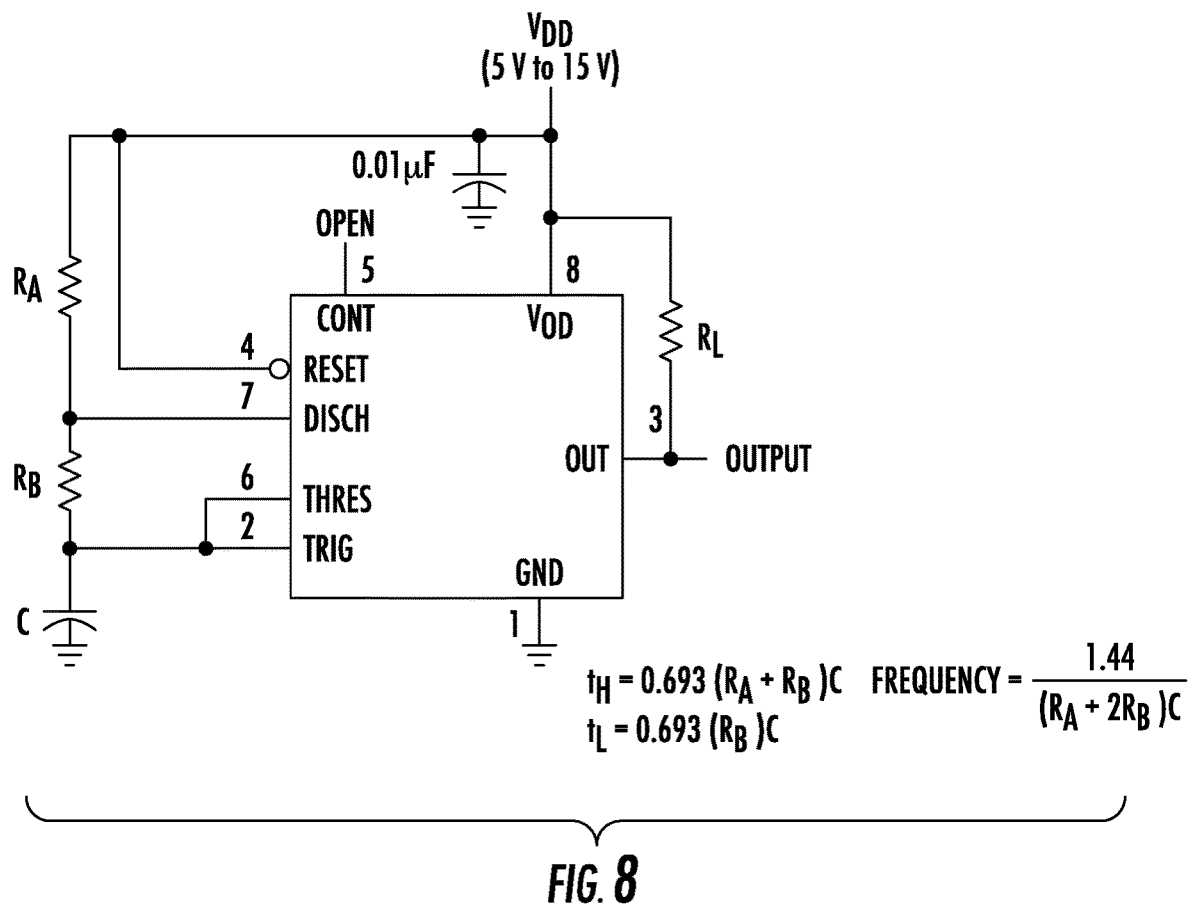
FIG. 8 shows an example of a TI TLC555CD 555 timer.
Figure 10:
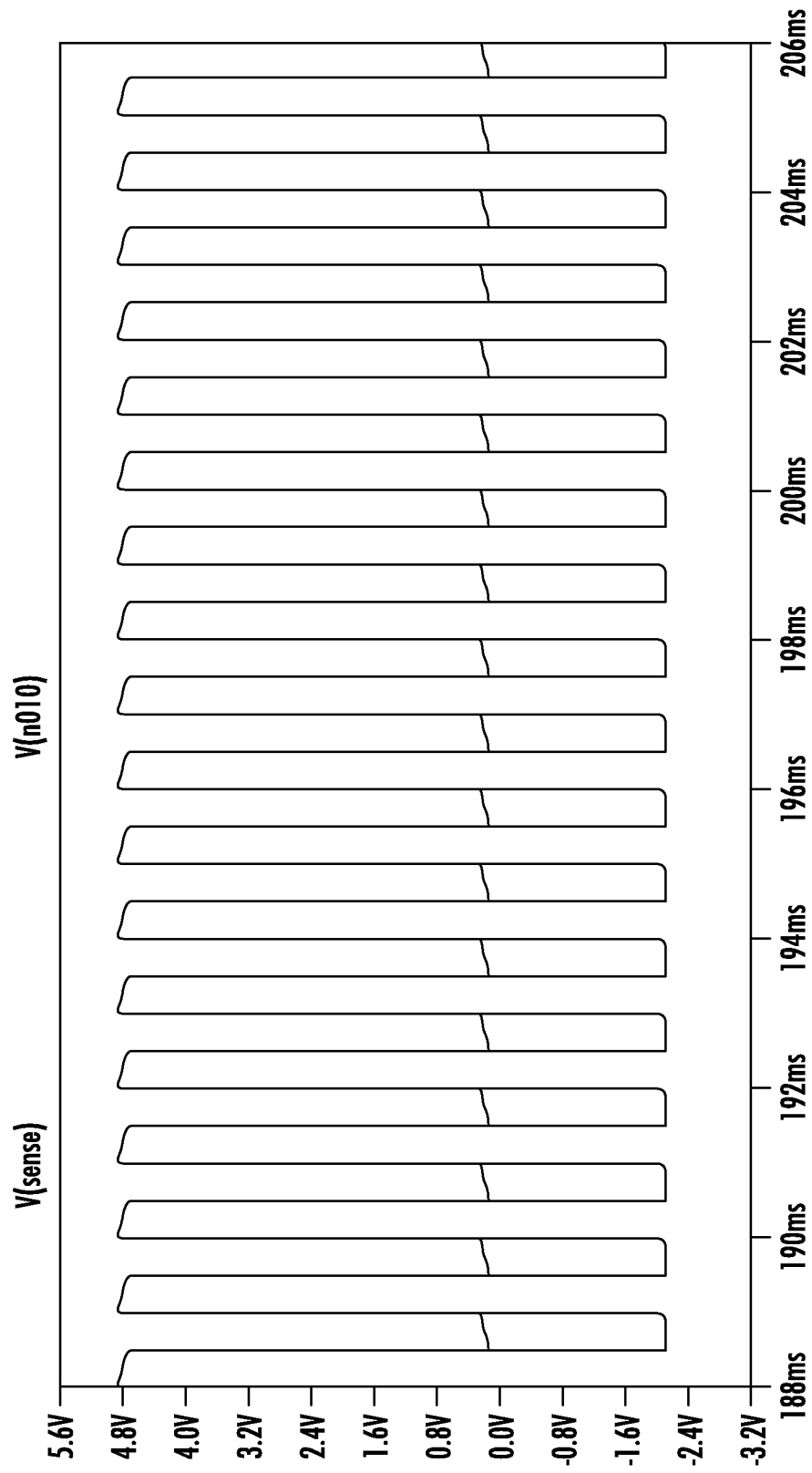
FIG. 10 shows a simulation of synchronous detection in water.
Figure 11:
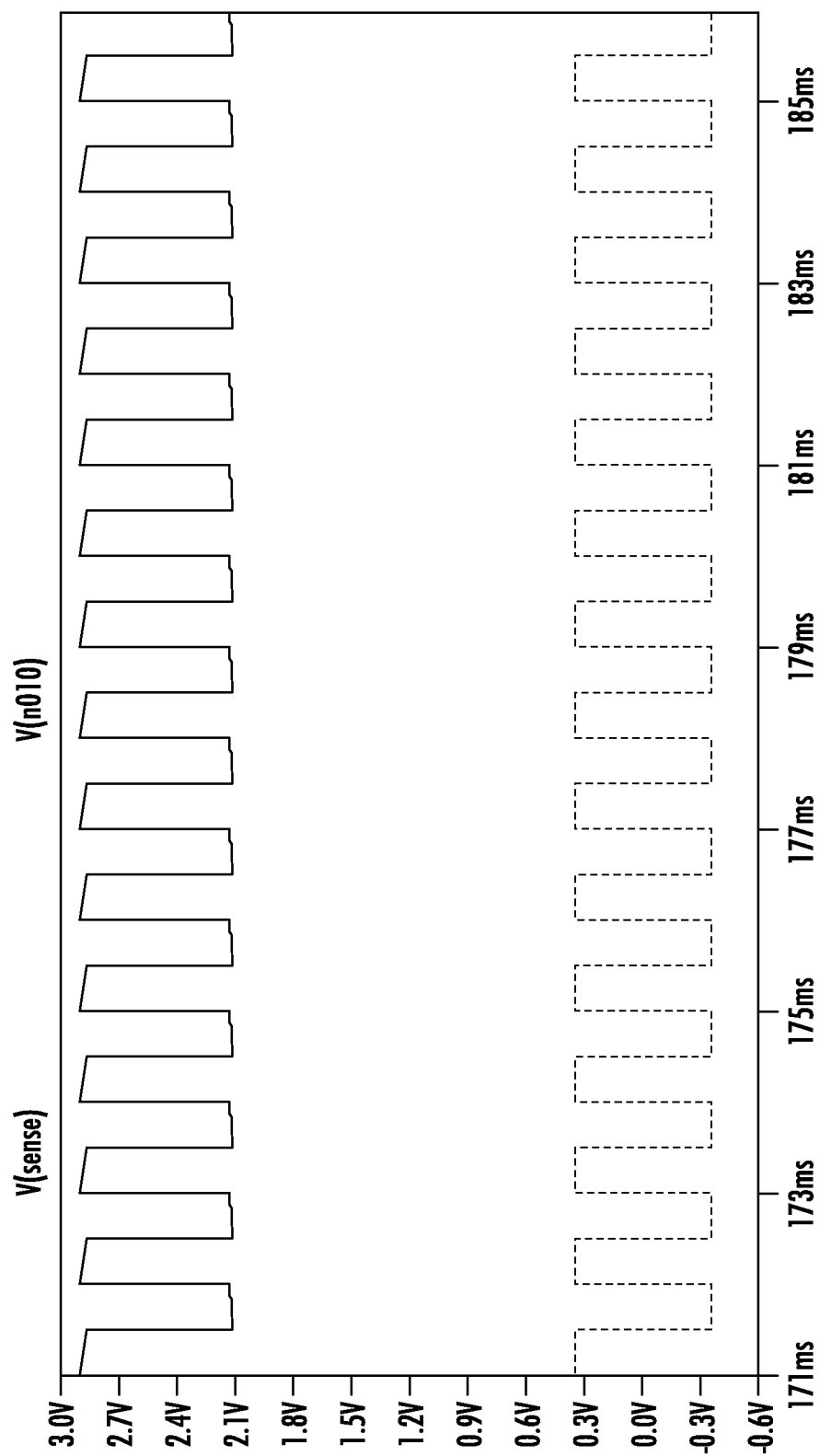
FIG. 11 shows a simulation of synchronous detection in oil.

FIGS. 10 and 11 are simulations of the first two stages of the analog circuitry. As seen in FIG. 8, the switch or FET connecting the positive terminal of the op amp to 2.5V is driven 180 degrees out of phase of the sense signal. This is accomplished in the circuit by inverting the 555 timer output that generates the 5V pk-pk 1 KHz square wave signal delivered to the energizing conductive area 110.

FIG. 10 shows a simulation of synchronous detection in water. The upper white trace shows 4.2V pk-pk centered around 0V which is representative of the AC signal coming in through the conductive sensing areas 100. The lower darker trace shows the 4.8 pk-pk signal after the first stage, the level shifting stage, centered around 2.5V. The upper white trace is what enters the second stage of the analog circuitry called the synchronous detector. The top trace at about 4.8 V is the output of the synchronous detector after an RC filter (i.e., 2.5V+4.8V/2=4.8V).

FIG. 11 shows a simulation of synchronous detection in oil. The lower trace shows 0.68V pk-pk centered around 0V which is representative of the AC signal coming in through conductive sensing areas 100. The lower trace shows the 0.68V pk-pk signal after the first stage, the level shifting stage, centered around 2.5V. The upper trace is what enters the second stage of the analog circuitry called the synchronous detector. The top trace at about 2.9 V is the output of the synchronous detector after an RC filter (i.e., 2.5V+0.68V/2=2.8V). This shows that much less energy is transferred in oil. Therefore, oil does not turn on the switch based on the thresholds the circuit sets, and an oil film on top of the water will not affect the switch turn on level. The water must touch enough of the second conductive sensing area in order to turn the pump on. Likewise, an oil film will not keep the pump on longer than intended. The pump will turn off once the water drops below the bottom of the bottom conductive sensing area 120 even if an oil film is present on top of the water and touching the bottom conductive sensing area 120.

An important consideration when choosing the op amps in the synchronous detector circuit shown in FIG. 9 is the input offsets and costs. A high input offset voltage manipulates readings in the circuit. Table 1 below shows two (2) possible op amp options. In a preferred embodiment, Option 1 was used as the chosen op amp. Low power rail to rail opamps can be used.

TABLE 1

Op amp options.

| Parameter | Option 1 | Option 2 |
|---|---|---|
| Device | ST Micro LM224PT | TI LMV324 |
| Number of circuits | 4 | 4 |
| Quiescent current | 1.5 mA | 410 µA |
| Voltage range of supply | 3-30 V | 2.7-5.5 V |
| Voltage range of inputs | 0-30 V | 0-5.5 V |
| Voltage range of outputs | 20 mV-28 V | 0.18-5.5 V |
| Input bias current | 100 nA | 250 nA |
| Input offset voltage | 7 mV MAX | 1.7 mV |
| Input offset current | 20 nA | 50 nA |
| Input offset drift with temperature | 30 µV/C | 5 µV/C |
| Common mode voltage range | 0-28 V | 0-1.7 V |
| Common mode rejection ratio | 80 dB | 63 dB |
| Open loop gain | $10^6$ | $10^8$ |
| Power supply rejection | 100 dB | 60 dB |
| Slew rate | 0.4 V/µs | 1 V/µs |
| Temp range | −40 C.-105 C. | −40 C.-125 C. |
| Cost/availability | $0.133 @ 1000. > 9K available on DK. | $0.38 @ 1000. > 16K available on DK. |
| Package | 14-TSSOP | 14-TSSOP |
| Gain bandwidth product | 1.3 MHz | 1 MHz |

The third stage of detection is window comparing. The outputs of the synchronous detectors can be sent to comparators. The window comparator circuits featured on the bottom two conductive sensing areas 120/130 are identical. The comparator system trips when the system sees over a threshold voltage. This corresponds to sensing over a 4V pk-pk signal which indicates water is present. This signal goes into a set reset flip flop that controls the pump state. The comparator system trips another output when the system sees under a predetermined threshold. This corresponds to sensing under a 0.78V pk-pk signal, and indicates that oil is present. For improved noise immunity, hysteresis may be added to the comparators. These signals are test points on the board as the circuitry does not contain a processor or RF module that could process and relay the information. When the comparators see between a lower and upper predetermined voltage, the system does not trip. This is indicative that the sensor is sensing air. Table 2 below shows possible calculations and tolerances for these window comparators. These values can be adjusted easily to accommodate any configuration.

TABLE 2

Window comparator calculations and tolerances for the two bottom conductive sensing areas.

| VREF Accuracy | 0.01 | VREF | 5 | | min | 4.95 | max |
|---|---|---|---|---|---|---|---|
| R1 accuracy | 0.1 | R1 | 887 | | min | 798.3 | max |
| R2 accuracy | 0.1 | R2 | 3300 | | min | 2970 | max |
| R3 accuracy | 0.1 | R3 | 5760 | | min | 5184 | max |
| VmonUV nom | 2.89 | | R1 | R2 | R3 | Total | |
| VmonUV min | 2.866391877 | V | 0.45 | 1.66 | 2.89 | 5 | |
| Vmon UV max | 2.924298784 | I | 0.0005 | 0.0005 | 0.0005 | 0.0005 | |
| | | R | 900 | 3320 | 5780 | 10000 | |
| VmonOV nom | 4.55 | | | | | | |

TABLE 2-continued

Window comparator calculations and tolerances for the two bottom conductive sensing areas.

| | | | R1 | R2 | R3 | Total |
|---|---|---|---|---|---|---|
| VmonOV min | 4.508595556 | | | | | |
| VmonOV max | 4.599678295 | V | 0.441404 | 1.642204 | 2.866392 | 4.95 |
| | | I | 0.000452 | 0.000452 | 0.000452 | 0.000452 |
| | | R | 975.7 | 3630 | 6336 | 10941.7 |
| | | | R1 | R2 | R3 | Total |
| | | V | 0.450322 | 1.67538 | 2.924299 | 5.05 |
| | | I | 0.000564 | 0.000564 | 0.000564 | 0.000564 |
| | | R | 798.3 | 2970 | 5184 | 8952.3 |

The third stage of sensing on the highest conductive sensing area 150 uses two comparators for two different trip points, as it is not necessary to have the three-state monitoring the window comparators provide. One of the comparators trips when it senses over a threshold voltage (e.g., 4.0V) corresponding to sensing water. This comparator trips the high-water alarm circuitry to alert the boat owner of a potential serious issue in the bilge. The other comparator is used as a test button. There is a spike of energy transfer to 1.5V pk-pk when a human places their hand between the conductive sensing areas 100 and the energizing conductive area 100 from <1V in air. The comparator trips when the conductive sensing area sees over a threshold voltage (e.g., 1.035V) and turns on the pump circuitry.

Figure 12:
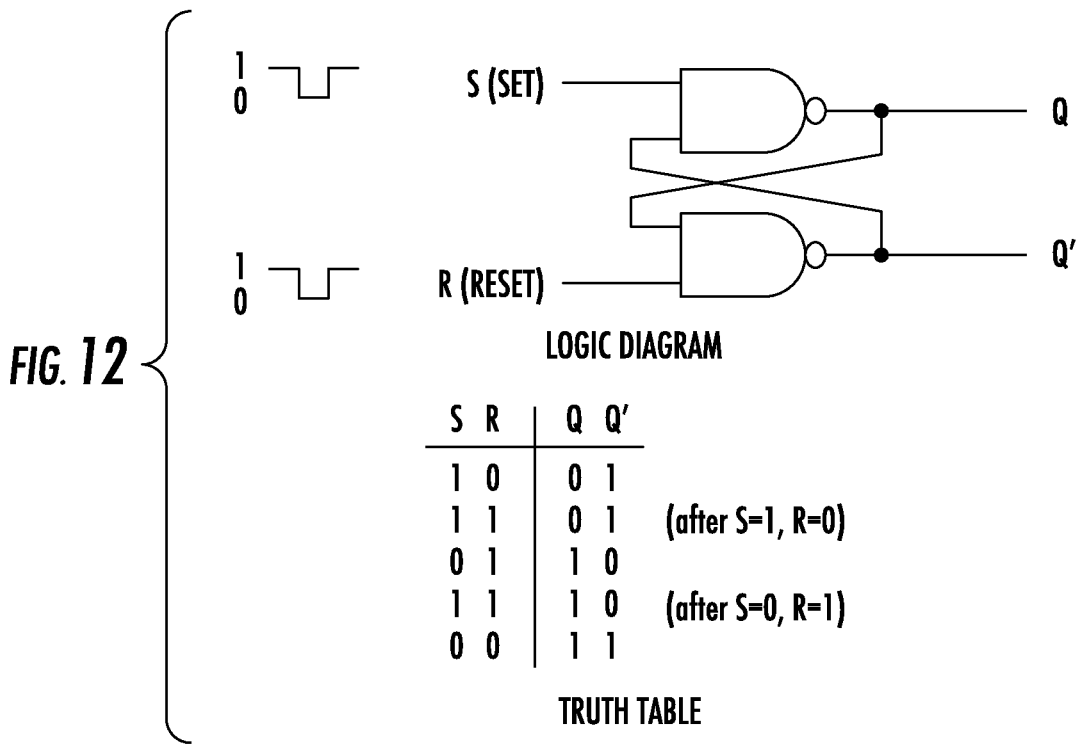
FIG. 12 shows an SR flip-flop logic.

The outputs from the lower two conductor sensing areas 120 and 130 are input into a basic set reset (SR) flip flop circuit made with two NAND gates. The bottom conductor sensing area first passes through an inverter. The truth table for the SR flip flop in FIG. 12 and state definitions for the bilge pump are shown in Table 3.

TABLE 3

Bilge switch SR switch logic.

| Second from the bottom sensing are (Set) | Bottom sensing area | Bottom sensing area inverted (Reset) | Output (Q) | Bilge scenario |
|---|---|---|---|---|
| 1 | 1 | 0 | 0 | Both sensing areas in air. Pump desired state OFF. |
| 1 | 0 | 1 | 0 | Reset sensing area in water. Set sensing area in air. Water level raising. Pump desired state OFF. |
| 0 | 0 | 1 | 1 | Both sensing areas in water. Pump desired state ON. |
| 1 | 0 | 1 | 1 | Set sensing area in air. Reset sensing area in water. Pump desired state ON. |

There are other ways to activate the pump in addition to using the bottom two conducive sensing areas as presented above. Another way to turn on the pump is a manual test by human interaction with the top conducting sensing area 150 by inserting a hand in the vicinity of the top sensor 150. Another way to turn on the pump is via a manual override from the control panel. The output of the SR flip flop, top conductive sensing area manual test, and manual override from the control panel signals all enter a three input OR gate. If any of these signals go high, the pump will turn on.

Figure 13:
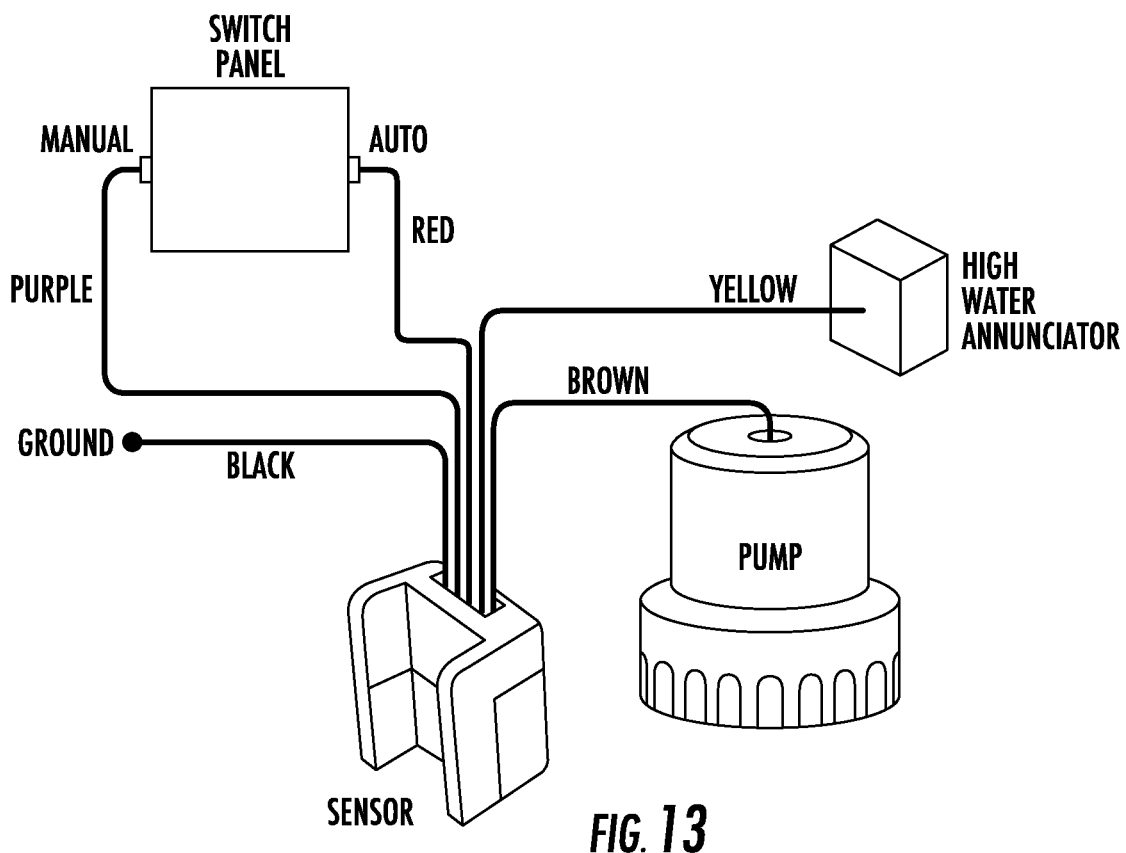
FIG. 13 shows the fluid sensing sensor 10 connected in a boat.
Figure 14:
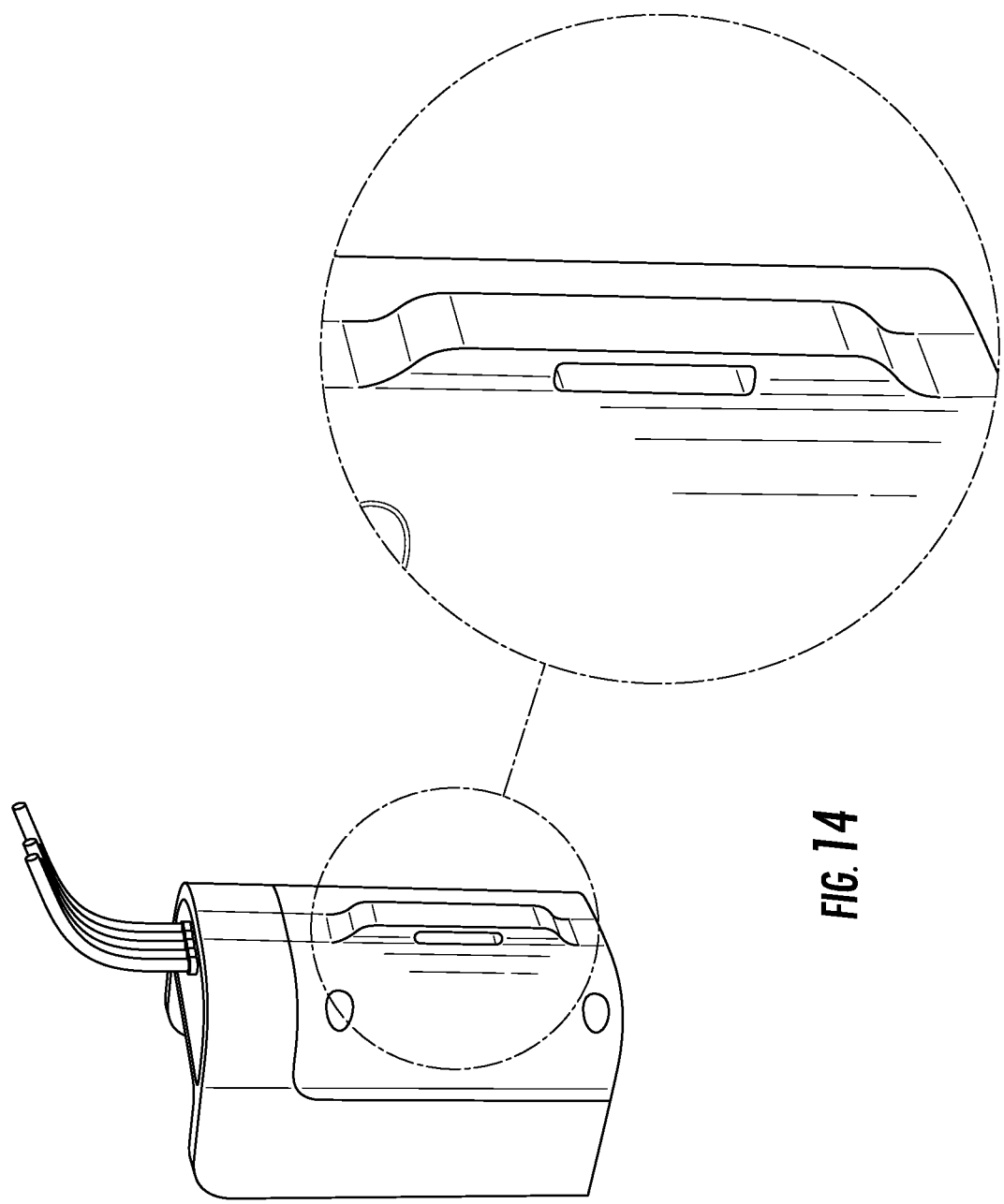
FIG. 14 shows a built-in bracket that can be used to mount the fluid sensing sensor to the hull of a boat.

A transistor as a solid-state relay can be used instead of a mechanical relay to minimize electronics. A field effect transistor (FET) could be used, but the body diode of the FET may cause problems in a reverse polarity scenario. For example, if the user connects boat power and ground respectively across the ground and pump input, the FET and device may fail. Using a transistor configuration consisting of two bipolar junction transistors (BJTs) can achieve the solid-state action without worry of a reverse polarity scenario. The BJT's should have a suitable current ratings as high as FETs of the same package, such as a TO-220 BJT package, which has a current rating of 20 A, or TO-247 BJT package, which can allow higher currents. The mechanical heat sink 300 connected to the transistor screw terminal can be used for the transistor to dissipate the heat generated by running the pump. The use of BJT's can prevent damage in the event that the pump wires are hooked up improperly. Also, a solid state relay or an electromechanical relay can be used The fluid sensing sensor 10 can be connected to boat connections including power, ground, pump input, manual override, and alarm, as shown in FIG. 13. 12-gauge stranded wire can be soldered directly to the board and color coded to aid the user in installation. The color code is listed below in Table 4.

TABLE 4

Wire colors.

| Wire | Color |
|---|---|
| Power | Red |
| Ground | Black |
| Pump | Brown |
| High-water Alarm | Yellow |
| Manual Override | Purple |

The power wires (power and ground) can connect the fluid sensing sensor 10 to the boat battery, which can be a 12V or 24V battery depending on the boat. Presently, all of the wires are 12 gauge but this can be reduced for some of the signals to save cost if necessary. If the fluid sensor is used in a non-boat environment, or non-marine application, the fluid sensor could operate in a range from approximately 10V to 30V.

The pump wire connects the boat pump to the fluid sensing sensor 10. When the sensor connects the pump to ground through a series of high current transistors, the pump turns on and water is pumped out of the bilge.

The manual override wire provides the user with a way of turning on the pump manually without the sensor circuitry being activated by the bilge environment. This is useful when the user is cleaning the boat. The manual override also can be used to test that the system is operational.

An annunciator wire can be used to connect the boat annunciator to the high-water alarm on the sensor. When the high-water circuitry is tripped by the bilge environment when the water reaches the top conductive sensing area 150, an alarm will sound on the boat.

As discussed above, a BJT transistor setup can be used to prevent transistor damage during a reverse polarity circuit, such as when the user connects power to ground and ground to the pump input. That is, the reverse polarity protection is done by using bipolar transistors as the solid state switching device to turn on the pump. A 10BQ030TR 30V 1 A Schottky diode can be designed into the power line to prevent damage to the circuit. Another reverse polarity scenario that could occur is the user miswiring the annunciator. The circuit comprises an op amp, current sense resistor, and supporting circuitry. Generally, the circuit is designed to not draw more than 250 mA of current. Any appropriate transistor can be used such as a BJT, which is a standard "current source" configuration to avoid allowing an overcurrent situation to occur as well.

Bi-directional transient voltage suppression (TVS) diodes to ground can be added to the power line, pump line, and energizing conducive area to protect against an ESD event. The power and pump lines can allow up to 30V and the driven energizing conductive area line allows up to 5V. The TVS diodes connected to the driven energized line and the pump line do not have to be populated at this time. Instead, large capacitors can be placed on the lines to prevent damage during ESD events. If the device proves to need a more robust ESD solution, the TVS diodes can be installed.

The device can be powered directly from the boat battery, which can be 12V or 24V. The device is designed to function between approximately 8V and 30V. The boat battery power can enter the system via a red 12-guage stranded wire, pass through a 30V 1 A Schottky diode and enter a voltage regulator and supporting circuitry that regulates the voltage down to 5V. The Schottky diode is used to help avoid damage due to reverse battery connection. The regulator used in the design can be a Microchip MCP16301T-E/CH. This is a high-voltage input step-down regulator that has an output current of at least 600 mA.

A 22 µH inductor with a minimum rating of 760 mA can be used when the voltage output is 5V. The Murata LQH5BPN220M38L can be used as an inductor because it is a 22 µH inductor that has a current saturation of 1.6 A. The inductor has a low profile compared to the inductors lines specifically called out in the regulator datasheet. The low profile helps to insure that it can fit into the mechanical enclosure.

As mentioned above, a 2.5 V reference can be used with the synchronous detector. This can be done by taking the 5V output of the regulator and dividing it by two by putting it though a voltage divider. The output of the voltage divider can be sent to a buffer to aid in stability and output drive capabilities.

It is desirable to sense the current through the pump. When the pump is pumping water, the pump requires and uses a lot more current. When the pump is pumping air, or dry pumping, it uses a lot less current. It is desirable to notify users when the pump is dry pumping to prevent pump damage or failure, prevent draining of the battery and rendering the vessel without a bilge pump system or any electrical system due to no battery voltage. A high side current sense can be used to avoid transistor grounding issues, such as a STMicro TSC1021BIPT current sense IC accompanied with a 3 W 5 mΩ sense resistor. The IC has an internally fixed gain of 20V/V. The voltage drop across the resistor when the current load is 20 A is 100 mV, and 5 mV when the current load is 1 A. With the 20V/V gain, the output voltage will be 2V when the current load is 20 A and 0.1 A with a current load of 1 A. The sense resistor can be chosen to be a 2512 size resistor so it can be replaced with a zero ohm if the current sense is to be unpopulated in the design. The output voltage can go to a test point if a processor or RF computing module is not used.

To accommodate a range of input voltages for the manual override from the control panel, an optoisolator circuit can be used to isolate the pump logic from the panel. The design enables the diode within the optoisolator to turn on between 1.4V and 2.4V. The 1.2KΩ resistor limits the current going into the override circuit to 27.5 mA at 33V and 2.5 mA at 3V. The Zener diode shunt limits the voltage entering the rest of the circuit to 3V. From there, the 120Ω and 3.3KΩ resistors tune the turn on voltage for the diode. The output of this optoisolator is the opposite logic the OR gate requires. Therefore, there is an inverter in line to control the pump with the correct logic.

The sensing is completed using the synchronous detecting methodology. The output from the synchronous detector trips a series of transistors to sound the annunciator. Synchronous detection is a method to measure the received energy from the "sink" conductive area that is less susceptible to electrical noise than other methods. This will reduce effects of wide band electrical noise generators such as motors and high power communications devices such as ship to shore radios from causing nuisance activation of the device.

Using the synchronous detection method reduces the risk of noise disruption during normal operation. The synchronous detector will ignore any other signal of another frequency. The synchronous detector gives more accurate readings to allow for detecting the difference between oil and air as fluids. If the signals are in phase, a maximum amount of energy will be transferred, and a liquid introduced results in a change in amplitude in the signal.

This method also could be done with a simple flex circuit. It could also be done with a flex circuit bonded to a fiberglass printed circuit board. It could also be done using a "rigid flex" technology which incorporates both rigid fiberglass circuit board with layers of a flex circuit. Also, wireless communication capability can be included by using a separate board or by using a printed circuit board having wireless chips.

The fluid sensing sensor 10 can be mounted to the hull of the boat using a built-in bracket, such as the one show in FIG. 14 or FIGS. 17, 19A, and 19B. The bracket has a through hole that can accommodate a strap or hose clamp that can wrap around the bilge pump.

Figure 16:
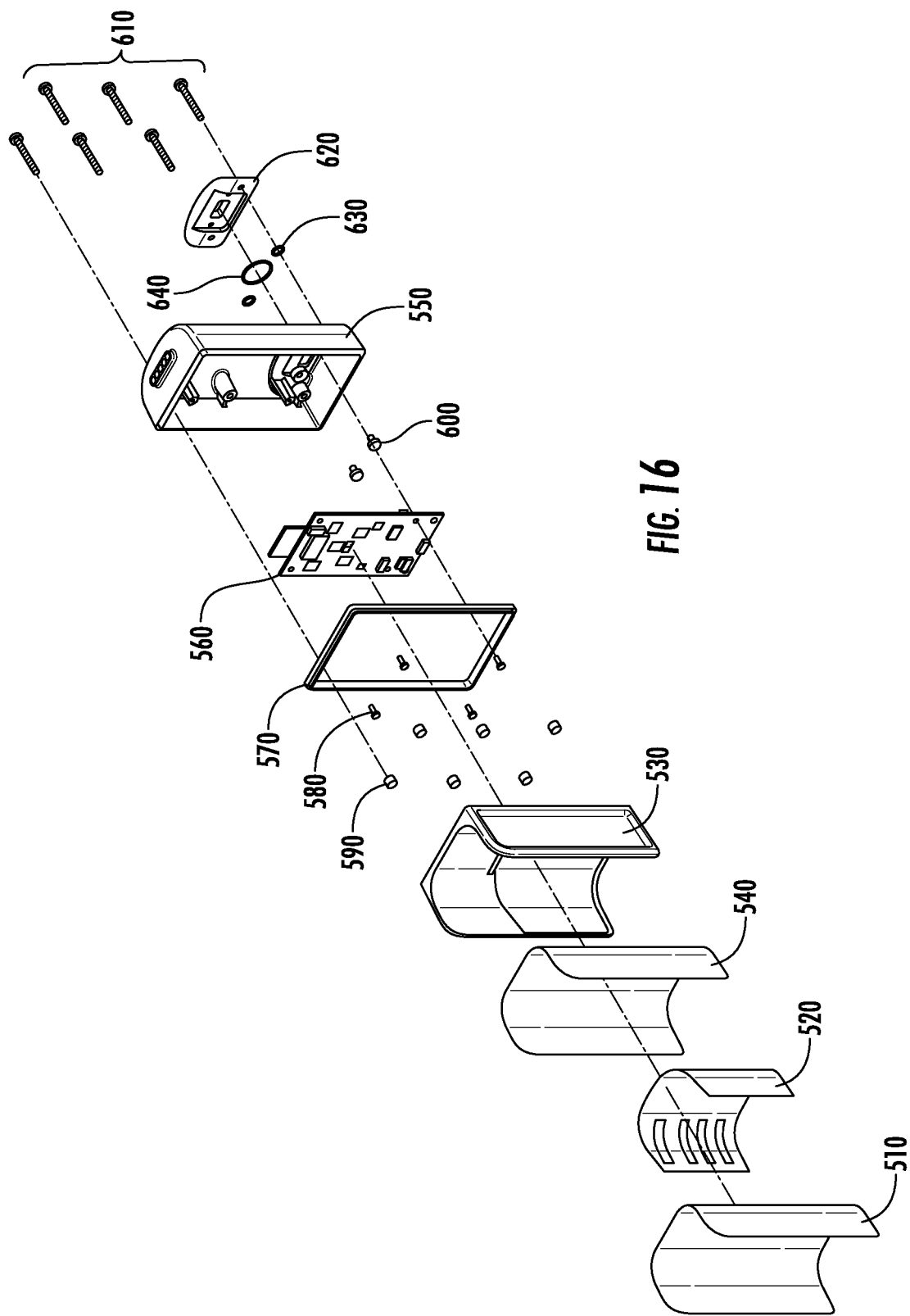
FIG. 16 shows an exploded view of another embodiment for the mechanical housing.

FIG. 16 shows an exploded view of another embodiment for the mechanical housing. A PC cover 540, flex sensor 520 and heat transfer tape 510 are inserted into the housing 530. A back housing 550 is configured to be mounted to the back of the housing 530. Main (PCB) board 560 and a T-seal 570 are mounted in the back housing 550 using PCB mounting screws 580 sealing screws 600. Screw inserts 590 and sealing screws 610 are used to connect the back housing 550 to the housing 530. The sealing screws 610 are also used to connect a heat sink 620 to the back housing 550. O-rings 630 and 640 are used to seal the heat sink 620.

Figure 17:
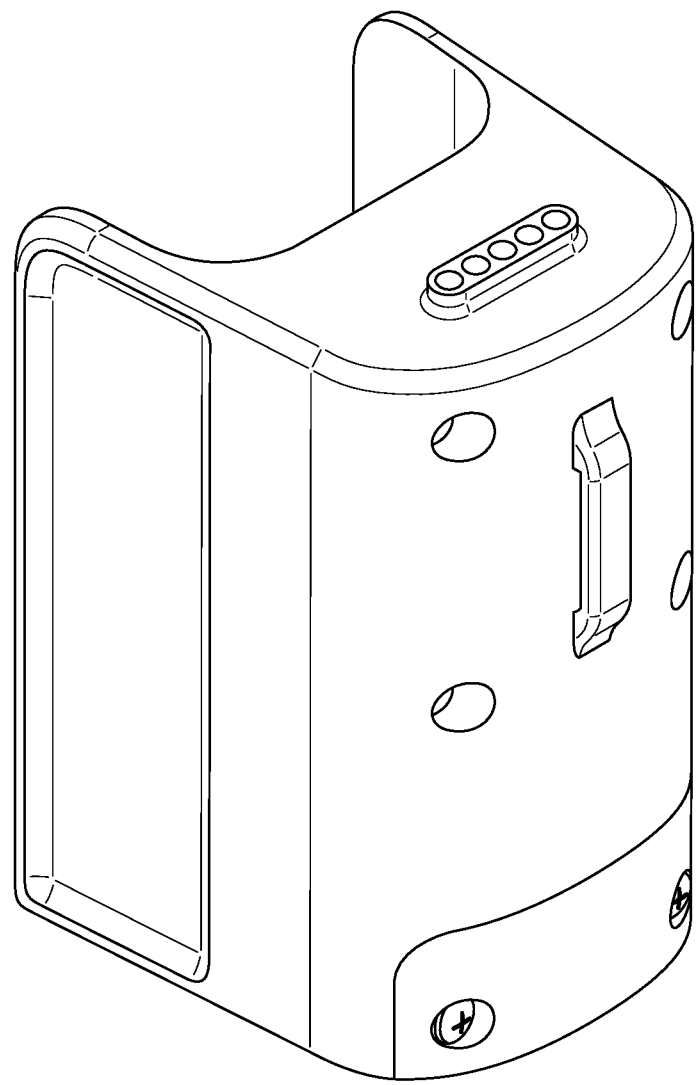
FIG. 17 shows a rear perspective view of the mechanical housing of FIG. 16.
Figure 19B:
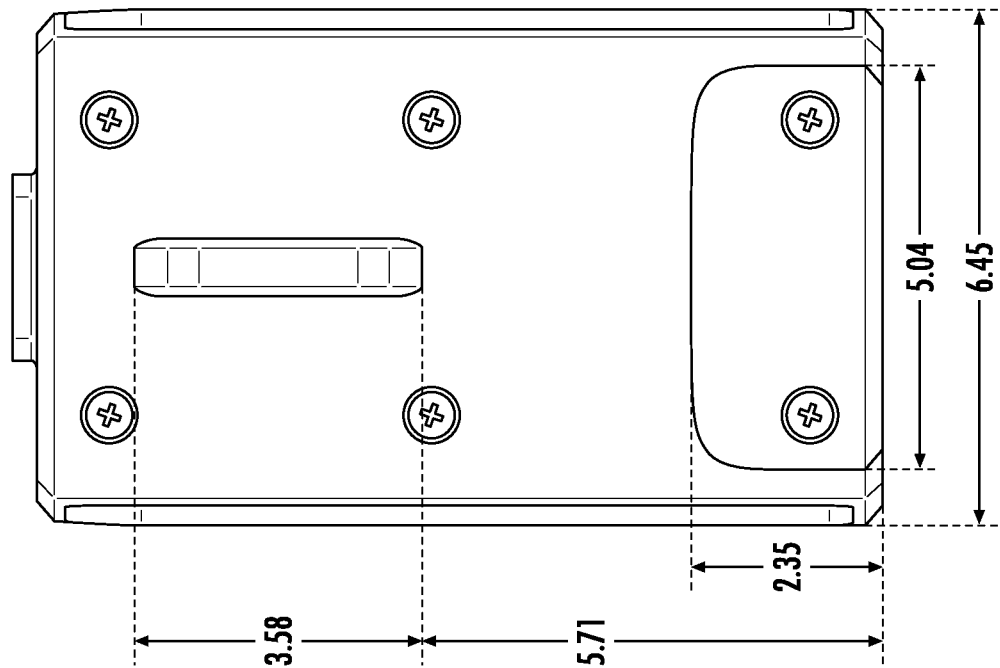
FIGS. 19A and 19B show a side view and a rear view, respectively, of the mechanical housing of FIG. 16.
Figure 19A:
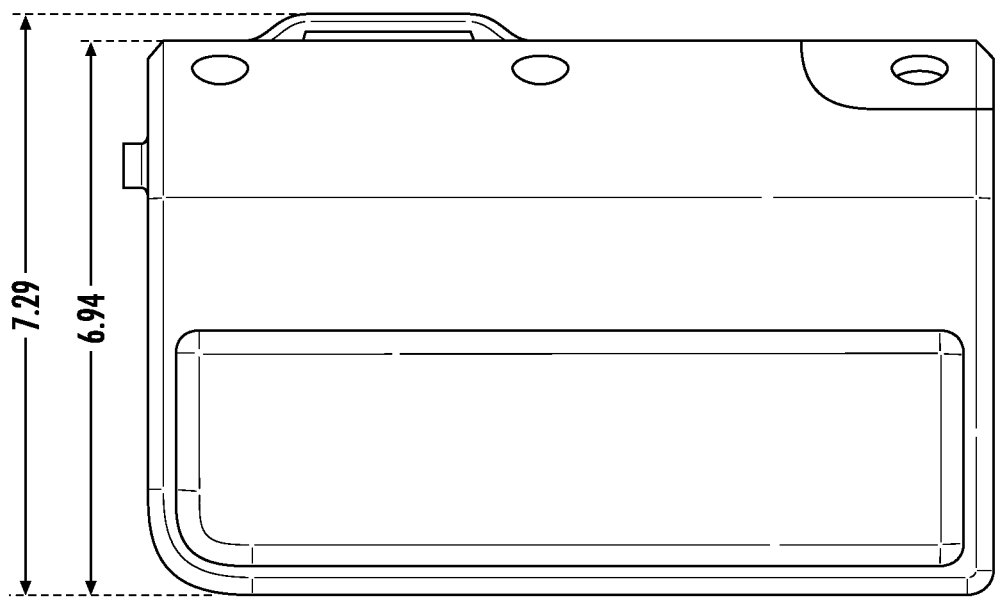
Figure 20:
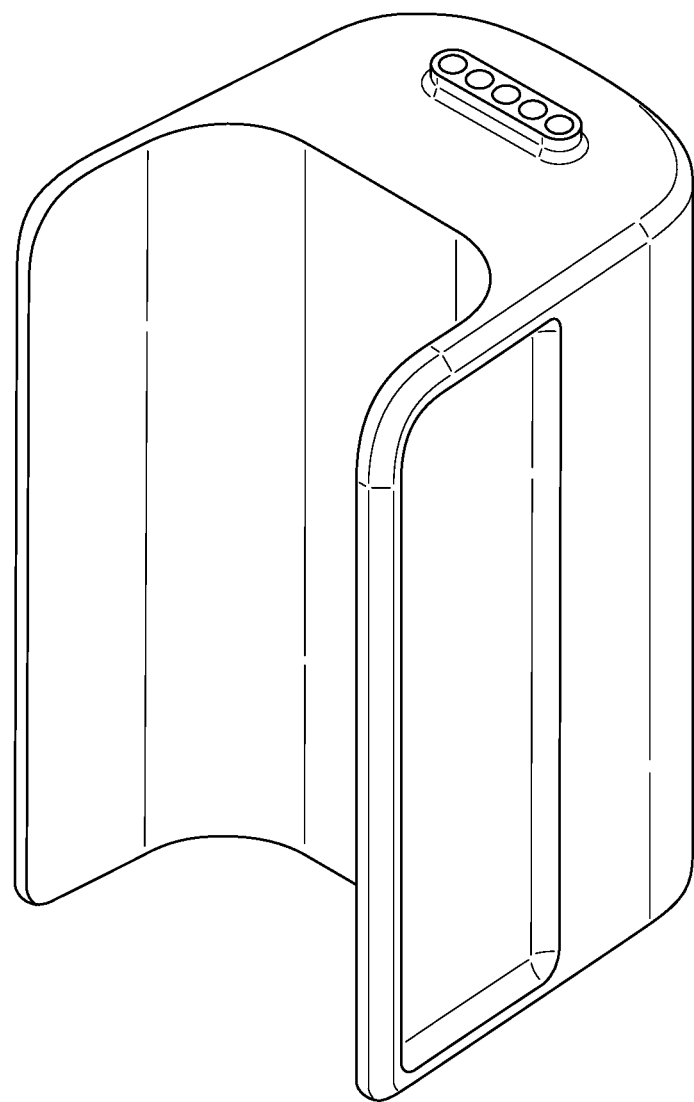
FIG. 20 shows a front perspective view of the mechanical housing of FIG. 16.

FIG. 17 shows a rear perspective view of the assembled mechanical housing of FIG. 16. FIGS. 18A and 18B show a top view and a front view, respectively, of the assembled mechanical housing of FIG. 16. FIGS. 19A and 19B show a side view and a rear view, respectively, of the assembled mechanical housing of FIG. 16. FIG. 20 shows a front perspective view of the mechanical housing of FIG. 16.

As presented above, the method of detecting oil vs air vs water can be done using level shifting, synchronous detecting, and window comparing. This can be done using three of the four conductive sensing areas 120-150. The bottom conductive sensing area 120 can act as the reset of the pump and can be used to sense oil. The next highest conductive sensing area 130 can act as the re-set of the pump and can sense oil. In at least one embodiment, the third highest conductive sensing area 140 is not used in this embodiment and is not connected to any detecting circuitry. The highest conductive sensing area 150 can be used to trip the high-water alarm and to be used as a pump test during installation.

By mixing/demodulating/rectifying the drive signal with the received signal, the AC signal can be converted to a DC amplitude output that represents the energy received by the sensing conductive area. If the drive signal and the receive signal are the same in both phase and frequency, the maximum DC amplitude is output by the synchronous detector. Changes in amplitude or phase (but not frequency) on the sensing conductive area (implying different fluids between sensors) would then be linearly related to the output of the synchronous detector.

The effect of electrical noise present that is comprised of frequencies that are not the drive frequency can be drastically reduced due to this synchronous detector method. This provides for a better signal to noise ratio for distinguishing between fluids.

A synchronous detector can be implemented as a multiplier or active rectifier that multiplies the positive portion of the received signal by itself or a positive constant and multiplies the negative portion of the input signal by itself or a negative constant. It is this multiplication that creates what is effectively a DC signal. This can also be viewed as the demodulation of a transmitted signal. Two signals of the same frequency result in the sum and difference of their frequencies which would be a DC signal and one twice the frequency. Subsequent filtering removes the higher frequency that is not of interest. While this is true for sinusoids, it is also true for rectangular and other waveforms that have a strong fundamental frequency component.

One particular embodiment of this synchronous detector is a +1/−1 multiplier that switches its unity gain polarity based on the drive signal input.

The information processed at the fluid sensor switch can be transmitted through a telematics device, so that the information is accessible for historical and present reporting.

The electronics described herein can be implemented on the main board and all functional aspects of the fluid sensing switch described herein can be performed by the main board. The design of the main board can be changed to include different gains or thresholds to accommodate different environments for the fluid sensing switch based upon many factors such as water motion, the viscosity of the oil, the thickness of the oil film, and mechanical configuration, etc. Alternatively, software could be used to implement the functional aspects of the fluid sensing switch. Further, a processor could be added to give the ability to communicate with the fluid sensing switch via hard wires or wirelessly While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, the scope of the invention is set forth in the claims.

What is claimed:

1. A fluid sensing switch comprising:
a flex sensor having a plurality of conductive sensing areas and an energizing conductive area, wherein the flex sensor detects a presence and a content of a bilge and produces a signal that is used to activate a pump, wherein when it is detected that the bilge contains substantially only water, a first conductive sensing area is used to activate the pump, and when an oil film is present in the bilge, a second conductive sensing area is used to activate the pump.

2. A fluid sensing switch comprising:
a flex sensor having a plurality of conductive sensing areas and an energizing conductive area;
a synchronous detector that detects a presence and a content of a bilge and reduces produces a signal that is used to activate a pump; and
a mechanical housing comprising two opposing sides and a middle portion between the opposing sides, wherein the flex sensor is mounted in the mechanical housing such that a middle portion of the flex sensor is mounted to the middle portion of the housing and side portions of the flex sensor are mounted to the opposing sides of the mechanical housing such that the plurality of conductive sensing areas face the energizing conductive area.

3. A fluid sensing switch comprising:
a flex sensor having a plurality of conductive sensing areas and an energizing conductive area, wherein the flex sensor detects a presence and a content of a bilge and produces a signal that is used to activate a pump, wherein one of the conductive sensing areas can be used to manually turn on and off the pump by placing and removing a wet hand between the energizing conductive area the one of the conductive sensing areas.

4. A fluid sensing switch comprising:
a flex sensor having a plurality of conductive sensing areas and an energizing conductive area, wherein the flex sensor detects a presence and a content of a bilge and produces a signal that is used to activate a pump, further comprising a vertical subtraction electrode that extends vertically adjacent to the conductive sensing areas, wherein the subtraction electrode subtracts a predetermined amount of energy from an energy measured by the conductive sensing areas to produce a more accurate reading of the level of the bilge.

5. A fluid sensing switch comprising:
a flex sensor having a plurality of conductive sensing areas and an energizing conductive area, wherein the flex sensor detects a presence and a content of a bilge and produces a signal that is used to activate a pump, further comprising a first conductive sensing area, a second conductive area, a third conductive sensing area and a fourth conductive sensing area, wherein the fourth conductive sensing area can be used to manually turn on and off the pump.

6. A fluid sensing switch comprising:
a flex sensor having a plurality of conductive sensing areas and an energizing conductive area, wherein the flex sensor detects a presence and a content of a bilge and produces a signal that is used to activate a pump, wherein when it is detected that the bilge contains substantially only water, a first conductive sensing area is used to activate the switch, and when an oil film is present in the bilge, a second conductive sensing area is used to activate the switch.

* * * * *